(12) United States Patent
Shen et al.

(10) Patent No.: US 11,706,076 B2
(45) Date of Patent: Jul. 18, 2023

(54) COMPUTER SYSTEM WITH COMPUTING DEVICES, COMMUNICATION DEVICE, TASK PROCESSING DEVICE

(71) Applicant: Novnet Computing System Tech Co., Ltd., Beijing (CN)

(72) Inventors: Yushi Shen, Sichuan (CN); Congchong Ru, Sichuan (CN); Zhengbin Yao, Sichuan (CN); Chuanjun Ma, Sichuan (CN)

(73) Assignee: Novnet Computing System Tech Co., Ltd., Beijing (CN)

( * ) Notice: Subject to any disclaimer, the term of this patent is extended or adjusted under 35 U.S.C. 154(b) by 0 days.

(21) Appl. No.: 17/794,468

(22) PCT Filed: Jan. 22, 2021

(86) PCT No.: PCT/CN2021/073406
§ 371 (c)(1),
(2) Date: Jul. 21, 2022

(87) PCT Pub. No.: WO2021/148015
PCT Pub. Date: Jul. 29, 2021

(65) Prior Publication Data
US 2023/0079205 A1    Mar. 16, 2023

(30) Foreign Application Priority Data

Jan. 23, 2020   (CN) .......................... 202010076227.X
Jan. 23, 2020   (CN) .......................... 202010076232.0
Jan. 23, 2020   (CN) .......................... 202010076233.5

(51) Int. Cl.
*G06F 15/173*     (2006.01)
*G06F 15/16*      (2006.01)
(Continued)

(52) U.S. Cl.
CPC ............ *H04L 41/045* (2022.05); *H04L 41/04* (2013.01)

(58) Field of Classification Search
CPC .............................. H04L 41/045; H04L 41/04
(Continued)

(56) References Cited

U.S. PATENT DOCUMENTS 7,551,635 B2 *   6/2009   Mallya .................... H04L 45/00
                                                              370/408
9,450,818 B2 *   9/2016   Diab .................. G06Q 30/0226
(Continued)

FOREIGN PATENT DOCUMENTS

CN          101986272 A      3/2011
CN          102833289 A     12/2012
(Continued)

OTHER PUBLICATIONS

CN202010076227.X first office action.
(Continued)

*Primary Examiner* — Bharat Barot
(74) *Attorney, Agent, or Firm* — IPro, PLLC

(57) ABSTRACT

The embodiments of the disclosure provide a computer system, comprising a plurality of computing devices, each computing device comprising a storage unit and at least one computing unit which are connected in parallel, the plurality of computing devices being divided into a plurality of nodes, and the plurality of nodes forming a network topology; a communication device comprising an autonomous domain building module and a first communication module, the first communication module being configured for connecting the plurality of computing devices in a communication manner; and a task processing device comprising an addressing module and a task processing module. Therefore, the solution of the present disclosure meets the explosive demand of
(Continued)

massive data and large amount computing power caused by artificial intelligence and blockchain to a certain extent.

8 Claims, 8 Drawing Sheets

(51) Int. Cl.
*H04L 41/045* (2022.01)
*H04L 41/04* (2022.01)

(58) Field of Classification Search
USPC .................................. 709/223–224, 245–246
See application file for complete search history.

(56) References Cited

U.S. PATENT DOCUMENTS

| | | | |
|---|---|---|---|
| 9,781,231 B2 * | 10/2017 | Stuber | .................. H04L 67/133 |
| 10,503,551 B2 | 12/2019 | Dube et al. | |
| 10,887,192 B2 * | 1/2021 | Thomasson | ........... H04L 41/085 |
| 2002/0165904 A1 | 11/2002 | Meyer et al. | |
| 2010/0142405 A1 * | 6/2010 | Cai | .................. H04W 36/0079 |
| | | | 370/254 |
| 2013/0286893 A1 | 10/2013 | Zhu et al. | |
| 2019/0251048 A1 | 8/2019 | Kavand et al. | |
| 2019/0327185 A1 | 10/2019 | Hassan et al. | |

FOREIGN PATENT DOCUMENTS

| | | |
|---|---|---|
| CN | 103338150 A | 10/2013 |
| CN | 103780475 A | 5/2014 |
| CN | 104182304 A | 12/2014 |
| CN | 104753873 A | 7/2015 |
| CN | 105577572 A | 5/2016 |
| CN | 105634784 A | 6/2016 |
| CN | 106454430 A | 2/2017 |
| CN | 106529517 A | 3/2017 |
| CN | 106598737 A | 4/2017 |
| CN | 106886503 A | 6/2017 |
| CN | 107273099 A | 10/2017 |
| CN | 107656812 A | 2/2018 |
| CN | 108805272 A | 11/2018 |
| CN | 109324890 A | 2/2019 |
| CN | 109564638 A | 4/2019 |
| CN | 109814552 A | 5/2019 |
| CN | 110928693 A | 3/2020 |
| CN | 110928694 A | 3/2020 |
| CN | 110932920 A | 3/2020 |
| RU | 2396592 C2 | 8/2010 |
| WO | 2019202216 A2 | 10/2019 |
| WO | 2019211715 A1 | 11/2019 |

OTHER PUBLICATIONS

CN202010076227.X second office action.
CN202010076232.0 first office action.
CN202010076232.0 second office action.
CN202010076233.5 first office action.

* cited by examiner

COMPUTER SYSTEM WITH COMPUTING DEVICES, COMMUNICATION DEVICE, TASK PROCESSING DEVICE

CROSS REFERENCE TO RELEVANT APPLICATIONS

This application claims priority to the Chinese patent application No. 202010076233.5 entitled "COMPUTER SYSTEM" filed on Jan. 23, 2020, the Chinese patent application No. 202010076227.X entitled "NETWORK TOPOLOGY" field on Jan. 23, 2020, and the Chinese patent application No. 202010076232.0 entitled "COMPUTING DEVICE AND RESOURCE ALLOCATION METHOD" field on Jan. 23, 2020 to the CNIPA, China National Intellectual Property Administration, the entire contents of which are incorporated herein by reference.

TECHNICAL FIELD

The present disclosure relates to the technical field of communications, and, more particularly, to a computer system.

BACKGROUND

The current computer system is mainly based on a CPU (Central Processing Unit). With the development of cloud computing, artificial intelligence and other technologies, big data algorithms are limited by the word length accuracy of the CPU, which is a serial way of reading and computing. A computer system based on CPU will not be able to meet the current requirements of large concurrent computing. Current networks use the best-effort principle in the case of extremely narrow bandwidth, and each data packet in the networks needs to perform protocol operation, which wastes the computing power of chips. With the explosion of big data and the development of optical fiber technologies, the original network architecture of constantly retransmitting after errors and sacrificing quality to control traffic may no longer meet the explosive demand of massive data and large amount computing power caused by artificial intelligence and blockchain in the case of sufficient bandwidth resources.

SUMMARY

The present disclosure provides a computer system to meet the explosive demand of massive data and large amount computing power caused by artificial intelligence and blockchain to a certain extent.

The embodiments of the present disclosure provide a computer system, including a plurality of computing devices, wherein each computing device includes a storage unit and at least one computing unit which are connected in parallel, the plurality of computing devices are divided into a plurality of nodes, and the plurality of nodes form a network topology;

a communication device, wherein the communication device includes an autonomous domain building module and a first communication module, wherein the autonomous domain building module is configured for, when it is detected that target nodes in the plurality of nodes meet resource requirements of a preset type of service, controlling the target nodes to form at least one layer of autonomous domains, one layer of autonomous domains includes at least one autonomous domain, and one autonomous domain includes at least one of the target nodes; and the first communication module is configured for connecting the plurality of computing devices in a communication manner; and a task processing device, wherein the task processing device includes: an addressing module and a task processing module, the addressing module is configured for addressing a first-type node and a second-type node in the network topology, the first-type node is a node providing target data required by a target task to be executed, the second-type node is a node providing a target algorithm required by the target task, and the addressing module is connected to the storage unit and the computing unit; and the task processing module is configured for interacting with the first-type node and the second-type node, so that the second-type node processes the target data provided by the first-type node by using the target algorithm.

The computer system according to the embodiments of the present disclosure includes the plurality of computing devices, the communication device and the task processing device, wherein the plurality of computing devices are divided into the plurality of nodes, and the plurality of nodes form the network topology, wherein each computing device includes the storage unit and the computing unit which are connected in parallel, the communication device includes the autonomous domain building module and the first communication module for connecting the plurality of computing devices in a communication manner, and the task processing device includes the addressing module and the task processing module. It follows that the computer system according to the embodiments of the disclosure no longer distinguishes between computing and network, but integrates computing and storage into the network, and parallelizes computing and storage, so that the data processing speed may be improved, and communication in the network topology may be realized based on the communication device, and with the cooperation of the addressing module and the task processing module, task processing may be carried out more quickly, thus meeting the explosive demand of massive data and large amount computing power caused by artificial intelligence and blockchain to a certain extent.

The above description is only a summary of the technical solutions of the present disclosure. To understand the technical means of the present disclosure more clearly so that the present disclosure may be implemented according to the contents of the specification, and to make one of the above and other objects, features and advantages of the present disclosure more obvious and understandable, the specific embodiments of the present disclosure are specially illustrated hereinafter.

BRIEF DESCRIPTION OF THE DRAWINGS

In order to illustrate the technical solutions in the embodiments of the present disclosure or the prior art in a clearer manner, the drawings desired in the description of the embodiments or the prior art will be described briefly hereinafter.

DETAILED DESCRIPTION OF THE EMBODIMENTS

Figure 1:
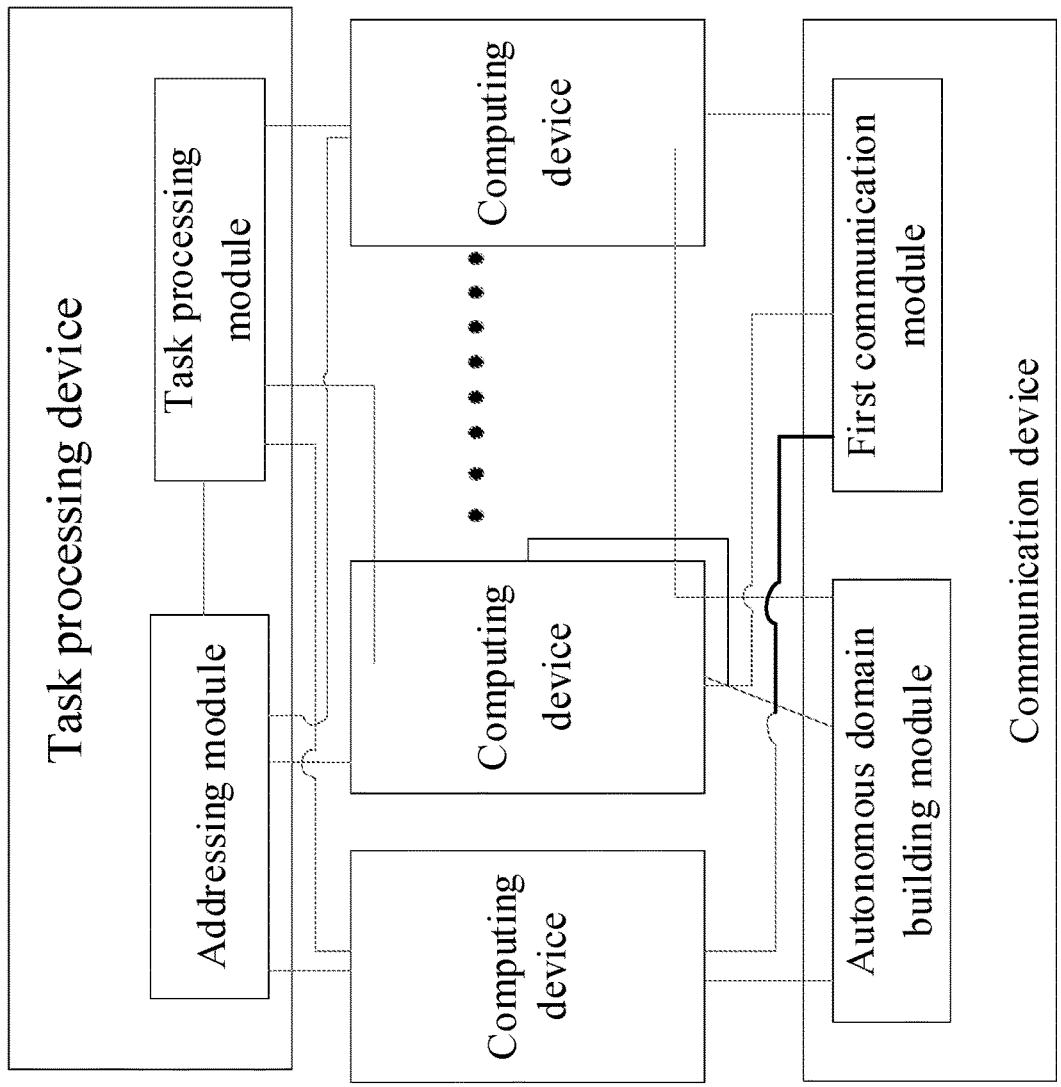
FIG. 1 is a structure block diagram of a computer system in an embodiment of the present disclosure.

The exemplary embodiments of the present disclosure will be described in further detail with reference to the drawings. Although the exemplary embodiments of the present disclosure are shown in the drawings, it should be understood that the present disclosure may be embodied in various forms and should not be construed as limited to the embodiments set forth herein. On the contrary, these embodiments are provided so that the present disclosure may be understood more thoroughly, and the scope of the present disclosure may be fully conveyed to those skilled in the art.

An embodiment of the present disclosure provides a computer system. As shown in FIG. 1, the computer system includes a plurality of computing devices, wherein each computing device includes a storage unit and at least one computing unit which are connected in parallel, the plurality of computing devices are divided into a plurality of nodes, and the plurality of nodes form a network topology, wherein one node includes at least one unit circuit in the storage unit and the computing unit, or the storage unit and at least one of the computing unit, or one of the computing device, or the plurality of the computing devices;

a communication device, wherein the communication device includes an autonomous domain building module and a first communication module, wherein the autonomous domain building module is configured for, when it is detected that target nodes in the plurality of nodes meet resource requirements of a preset type of service, controlling the target nodes to form at least one layer of autonomous domains, one layer of autonomous domains includes at least one autonomous domain, and one autonomous domain includes at least one of the target nodes; and the first communication module being configured for connecting the plurality of computing devices in a communication manner; and a task processing device, wherein the task processing device includes: an addressing module and a task processing module, the addressing module is configured for addressing a first-type node and a second-type node in the network topology, the first-type node is a node providing target data required by a target task to be executed, the second-type node is a node providing a target algorithm required by the target task, and the addressing module is connected to the storage unit and the computing unit; and the task processing module is configured for interacting with the first-type node and the second-type node, so that the second-type node processes the target data provided by the first-type node by using the target algorithm.

wherein, the autonomous domain building module, the first communication module, the addressing module and the task processing module may be disposed inside the node or independently outside the node.

In addition, the target task may be sent by other nodes, or may be executed by its own node under a predetermined condition.

For the computer system according to the embodiment of the present disclosure, for example, a network topology is formed by 100 nodes, wherein the node numbered 1 needs a video composed of source video materials and AR materials, the addressing module may search in the network topology for nodes that may provide the source video materials required for this task, nodes that may provide the AR materials required for this task, and nodes that may perform video synthesis. For example, if the addressed node that may provide the source video materials is the node numbered 2, the node that may provide the AR materials is the node numbered 3, and the node that may perform video synthesis is the node numbered 4, the task processing module may control the node numbered 1 to interact with the nodes numbered 2, 3, and 4 to complete the task.

Specifically, for example, the task processing module controls the node numbered 1 to send instruction information to the node numbered 2, so that the node numbered 2 sends the source video materials stored in the storage unit thereof to the node numbered 4; the task processing module controls the node numbered 1 to send instruction information to the node numbered 3, so that the node numbered 3 sends the AR materials stored in the storage unit thereof to the node numbered 4; the task processing module controls the node numbered 1 to send instruction information to the node numbered 4, so that a plurality of computing units in the node numbered 4 perform video synthesis according to the source video materials and the AR materials received, and after completing the synthesis of a part of data, cache the data to the storage unit in the node numbered 4, so that the synthesized data is transmitted to the node numbered 1 by the storage unit storing the synthesized data, and stored in the storage unit in the node numbered 1.

As can be seen from the above, the computer system in the embodiment of the present disclosure includes the plurality of computing devices, the communication device and the task processing device, wherein the plurality of computing devices are divided into the plurality of nodes, and the plurality of nodes form the network topology, wherein each computing device includes the storage unit and the computing unit which are connected in parallel, the communication device includes the autonomous domain building module and the first communication module for connecting the plurality of computing devices in a communication manner, and the task processing device includes the addressing module and the task processing module. It can be seen that the computer system in the embodiment of the present disclosure no longer distinguishes between computing and network, but integrates computing and storage into the network, and parallelizes computing and storage, so that the data processing speed may be improved, and communication in the network topology may be realized based on the communication device, and with the cooperation of the addressing module and the task processing module, task processing may be carried out more quickly, thus meeting the explosive demand of massive data and large amount computing power caused by artificial intelligence and blockchain to a certain extent.

Optionally, the network topology includes at least one layer of network structure (i.e., the plurality of nodes form at least one layer of network structure), and the ranges of data transmission time delays corresponding to different layers are different. The data transmission time delay corresponding to a first target layer network structure includes a data transmission time delay from a node in the first target layer network structure to the target node, and the first target layer network structure is any layer of the network structure.

Figure 2:
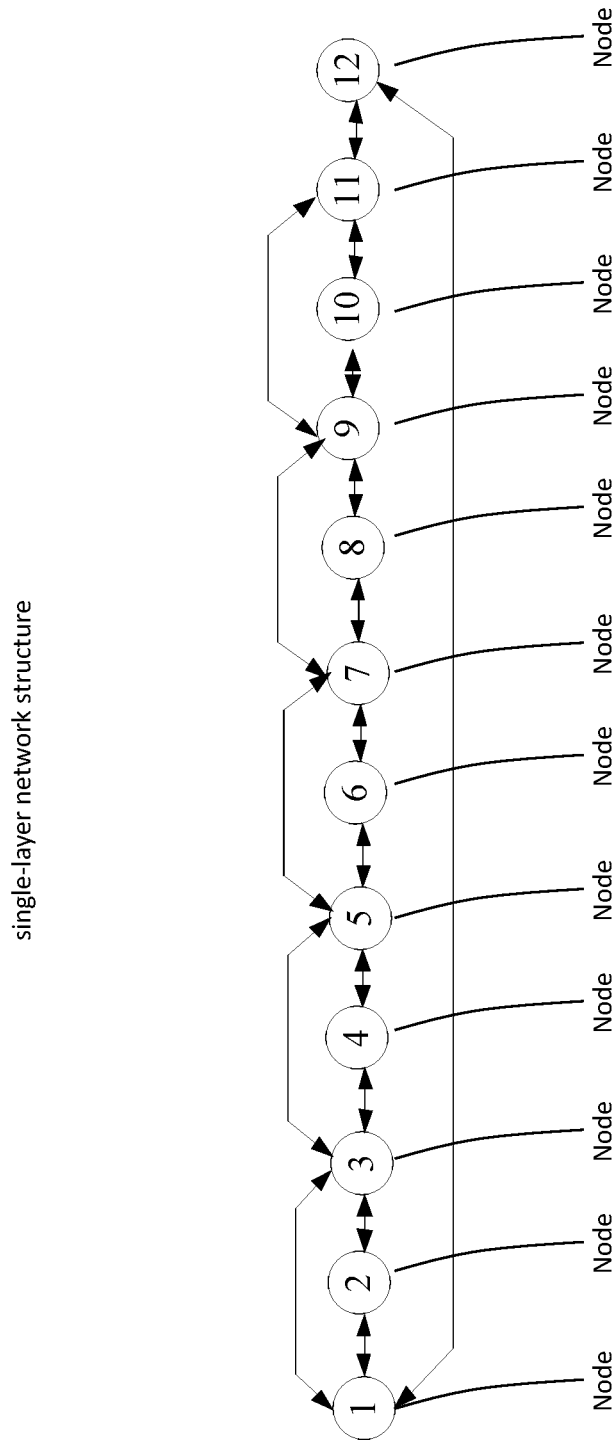
FIG. 2 is a schematic diagram of a single-layer network structure in a network topology in an embodiment of the present disclosure.

Optionally, as shown in FIG. 2, each layer of network structure includes at least one loop structure, and each loop structure includes a plurality of nodes; wherein the nodes in each loop structure are connected from head to tail, and according to a numbering sequence of the nodes in each loop structure, an odd node is connected to the next node of its adjacent node, or an even node is connected to the next node of its adjacent node. Therefore, in the embodiment of the present disclosure, the network topology adopts a flat network structure physically, and the left and right nodes use addresses as unique identifiers. The nodes of the whole network may divide the address space geographically, which is convenient for hot plug, and a layered layout is adopted. The whole network is divided into multiple layers according to the addresses, and all nodes in a single layer are interconnected. Each layer of the network uses the same loop topology, and the layers are vertically bridged.

It may be understood that the specific connection mode for the loop structure is not limited herein, but may also be that the plurality of nodes included in each loop structure are connected from head to tail and are connected to the next node of its adjacent node.

Therefore, it can be seen that the network topology includes a fault-tolerant network with multiple layers connected in series and loops, wherein the structure used in each layer is same, and each layer uses the same loop topology, and the layers are vertically bridged. Such same hardware equipment, the repeated superposition of the same structure, and the same software management gradually expand the degree of resource aggregation and complete the application-oriented super project. In addition, there is no connection across more than two layers in this structure, which simplifies the software structure and system management. Communication loops with different intervals in the layer ensure that the loop may not be interrupted, and normal communication may be maintained when any two nodes in the loop fail (including PCB board extraction).

Optionally, there are at least two connection paths between two adjacent layers of network structures. For example, a third node of a first-layer network structure is connected to a fourth node of a second-layer network structure, and a fifth node of the first-layer network structure is connected to a sixth node of the second-layer network structure, that is, there may be two connection paths between the first-layer network structure and the second-layer network structure.

Optionally, the computing device further includes:

a PCB (printed circuit board) single board, wherein the storage unit and the computing unit are located on the PCB single board;

a board frame, wherein the PCB single board is disposed on the board frame;

a cabinet, wherein the board frame is disposed in the cabinet;

a computer room, wherein the cabinet is disposed in the computer room;

a first data management center, wherein the first data management center includes at least two computer rooms; and a second data management center, wherein the second data management center includes at least two of the first data management centers.

Therefore, it can be seen that the computing device includes the storage unit and the computing unit, and both the storage unit and the computing unit are provided with the virtual management unit circuit for communication and management, and are connected to the external physical communication interface, such that the storage unit and the computing unit are parallel, and different computing units are parallel. Therefore, it can be seen that, the computing device in the embodiment of the present disclosure no longer distinguishes between computing and network, but melts computing and storage into the network, and sets the computing unit to have a unified interface for external communication, so that the computing and storage may be paralleled, Therefore the data processing speed may be improved, and to a certain extent, the explosive demand of massive data and large amount computing power caused by artificial intelligence and blockchain may be met.

Further, after the plurality of computing devices are divided into the plurality of nodes, these node form an eight-layer network structure, wherein, the node of the first-layer network structure which is silicon (S) is a unit circuit of the computing unit, and is capable of programing the internal circuit structure and managing it; the node of the second-layer network structure represented as board (B) is the computing unit, which is used in a single PCB, and 10 Gbps communication wires are disposed in the single PCB with PCB maintenance between multiple chips; the node of the third-layer network structure represented as frame (F) is the PCB single board, which is used in a single frame, and 10 Gbps communication wires are disposed in the PCB between the backboards of the multiple PCBs and in full communication; the node of the fourth-layer network structure represented as cabinet (C) is a board frame, which is used in a single cabinet, and 10 Gbps communication wires are disposed in the frame between multiple board frames and in full communication; the node of the fifth-layer network structure represented as district (D) is the cabinet, which is partitioned between multiple cabinet in the data center, and the 10 Gbps optical fiber network is entirely not required to be used in the computer room; the node of the sixth-layer network structure represented as zone (Z) is the computer room, which is partitioned between multiple computer rooms in the data center, and the 10 Gbps optical fiber network is entirely not required to be used in the computer room; the node of the seventh-layer network structure represented as enterprise (E) is the first data management center, which is configured with a wide-are optical fibers according to its demand, and the Internet caries the whole network management; the node of the eighth-layer network structure represented as world (W) is the second data management center, which is configured with a wide-area optical fibers according to its demand, and the Internet carries the whole network management. It may be understood that for the network topology composed of a plurality of computing devices, the division form of each layer of the network structure is not limited herein.

The above eight layers of network structures may be located by eight groups of 8 bit, totaling 64 bit. That is to say, a working status of any device, or any unit circuit or any hard disk in the device may be independently queried and managed in the whole network (the whole world). Apparently, this network topology design may meet the demand for a long time in the future. This network topology could be easily added with more layers of network structures above the data center (i.e., W layer) if, at some point in the future, the network does not scale enough to meet disclosure requirements. If the number of independent objects that may be served by a superchip increases significantly in the future, resulting in insufficient network address allocation, it is easy to scale below a chip layer (i.e., S layer) and even locate to a cellular level. It follows that the network topology may be scaled indefinitely to meet possible future needs.

That is, the network topology in the embodiment of the present disclosure covers from chips, devices to data centers, and a huge computing system is considered as a whole in one resource domain. The hardware capability may be expanded infinitely, the software may be reused, and the structure may be nested in multiple layers.

In addition, the described network topology may define three types of hardware resources and uniquely locate the hardware resources with uniform 64 bit addresses.

The first resources refer to small particle resource: referring to resources with full function inside the chip, and marked location with address field S (Silicon).

The second resources refer to single board resources: referring to internal resources of a board card with full function, and marked location with address field B (Board).

The third resources refer to multi-card combined resources: generally, referring to multi-card integrated resources assembled by independent board cards, including the combination of various cabinets and computer rooms. The resources are classified into six levels, which are marked locations with address fields F (Frame), C (Cabinet), D (District), Z (Zone), E (Enterprise), and W (World).

For storage resources, the granularity of data may be unified, that is, 1 Kb data packet. Specifically, the computer system in the embodiment of the present disclosure allocates different tasks in a super resource pool as required. It may be compared with the reading and writing process of a single hard disk. Every time a new file is written to the hard disk, it occupies a part of the hard disk resources. Every time a file is deleted, the occupied resources are released. Because each file has different size, many fragmentary fragments of storage resources are left after being written and deleted many times. In order not to waste these fragment resources, a system scheduler is required to make full use of these fragments and have the ability to manage any piece of data in the hard disk. Similarly, if a traditional hard disk operation is enlarged to the whole system, a similar situation may also be encountered in the computer system according to the embodiment of the present disclosure, which requires the system to be capable of uniformly scheduling any tiny resource in the whole system. The difference is that the computer system according to the embodiment of the present disclosure may independently and finely schedule transmission/exchange/storage/management of various resources. All the above resources form a unified structure, which may perform a single task, or disperse the resources in designated places, and perform numerous independent tasks at a same time. In network transmission, network exchange, network storage, network computing, and network management, the resources of the computer system according to the embodiment of the present disclosure take 1 KB data packet as nominal management granularity, and take integer multiples of 1 KB data packet as unit.

That is, the three elements of the data packet of the computer system according to the embodiment of the present disclosure are: 1) fixed format; 2) infinite definition; and 3) unique interpretation. All information and data of the computer system according to the embodiment of the present disclosure adopt a 1 KB unified format, which is called in-band information. Correspondingly, in the process of data transmission and storage, auxiliary information, called out-of-band information, needs to be added for data integrity. A fixed length of 1 Kbyte may express a short message, or may expanded into a video file composed of numerous data packets as required. 1 KB is 512 word, 1 word equals 2 byte, 1 byte equals 8 bit and 1 word equals 32 bit.

Figure 11:
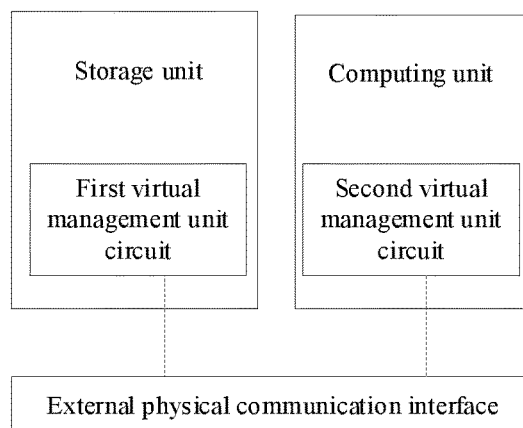
FIG. 11 is a structural block diagram of a computing device provided by an embodiment of the present disclosure.

Optionally, as shown in FIG. 11, the computing device includes: a storage unit and at least one computing unit, wherein the storage unit includes a first virtual management unit circuit for communicating and managing the storage unit, and the computing unit includes a second virtual management unit circuit for communicating and managing the computing unit; the first virtual management unit circuit and the second virtual management unit circuit are connected to an external physical communication interface.

The first virtual management unit circuit is a unit circuit in the storage unit storing programs for realizing communication (including internal communication and external communication of nodes) and managing the storage unit (for example, resource management). The second virtual management unit circuit is a unit circuit in the computing unit storing programs for realizing communication (including internal communication and external communication of nodes) and managing the computing unit (for example, resource management).

In addition, both the storage unit and the computing unit are provided with the virtual management unit circuits for communication and management, and are connected to the external physical communication interfaces, that is, the storage unit and the computing unit are parallel, and different computing units are parallel. Therefore, it can be seen that, any two of all the computing units and storage units included in the computing device according to the embodiment of the present disclosure are connected in parallel.

In addition, the virtual management unit circuits of the storage unit and the computing unit are both connected to the external physical communication interface, that is, the storage unit and the computing unit included in the computing device according to the embodiment of the present disclosure are provided with a unified external communication interface, so that information instructions transmitted from the external physical communication interface may directly enter the computing unit and the storage unit.

Therefore, it can be seen that, the computing device in the embodiment of the present disclosure no longer distinguishes between computing and network, but melts computing and storage into the network, parallelizes the computing units, parallelizes the computing unit and the storage unit, and sets a unified interface for external communication, so that the computing speed may be improved, and to a certain extent, the explosive demand of massive data and large amount computing power caused by artificial intelligence and blockchain may be met. Furthermore, the computing device in the embodiment of the present disclosure does not include a CPU (central processing unit), so the computing device may be infinitely expanded.

Optionally, the computing unit includes a programmable logic component. Therefore, it can be seen that the computing unit of the computing device in the embodiment of the present disclosure may be composed of a programmable logic component.

Logic components are electronic components used to realize certain characteristic logic functions. The simplest logic devices are AND, OR, NOT gate, or the like. On this basis, complex sequential and combinational logic functions may be realized. However, the function of the programmable logic component is not fixed, but may be changed according to the needs of users, that is, the logic function of the component is determined by a programming method. Therefore, the computing unit included in the computing device in the embodiment of the present disclosure includes the programmable logic component, so that the computing unit of the computing device may change the functions that may be realized thereby according to the needs of the users, that is, each computing unit of the computing device in the embodiment of the present disclosure does not realize unique function any longer, but may realize different logic functions, i.e., different algorithms by the programming method, so that a bandwidth of the computing device in the embodiment of the present disclosure may be dynamically configured.

Optionally, the second virtual management unit circuit, when acquiring a hardware architecture adjustment instruction, controls the programmable logic component to perform hardware architecture adjustment according to the hardware architecture adjustment instruction.

In the embodiment of the present disclosure, the hardware architecture adjustment instruction may be sent by a network side or automatically generated under a preset condition. In the embodiment of the present disclosure, the computing device may adjust the hardware architecture of the programmable logic component independently or according to the instruction of the network side, that is, adjust the logic function of the programmable logic component. However, if a plurality of computing devices are divided into a plurality of nodes, the hardware architecture adjustment may also be performed in some nodes. Therefore, the nodes in the embodiment of the present disclosure may also support node function fragmentation, and may be used not only as transit nodes, but also as control nodes, service nodes, and the like.

Optionally, the programmable logic component is a FPGA array. That is, when the computing unit included in the computing device in the embodiment of the present disclosure includes a programmable logic component, the programmable logic component may be an FPGA. The FPGA is a programmable component, which may realize any calculation theoretically. However, considering the efficiency, the FPGA is suitable for parallel calculation and pipeline calculation, typical calculation such as AI (Artificial Intelligence), video transcoding, searching, or the like, so that the computing device in the embodiment of the present disclosure supports high-speed access, may be plugged in and unplugged, and may be expanded at will. It may be understood that the programmable logic component included in the computing unit of the computing device in the embodiment of the present disclosure may also be other programmable logic components other than the FPGA.

Moreover, optionally, in the embodiment of the present disclosure, the FPGA is used as an independent resource, which works away from the CPU, and the FPGA resource may be used by scribing. That is, there may be one fixed module in the FPGA to complete the following functions:

1. network communication;
2. parsing a specific instruction, that is, a response to one set of resource applications; and
3. feeding the applications that may be met by itself and the use of resources itself.

In a word, the FPGA in the embodiment of the present disclosure may communicate independently with the network without relying on the control of the CPU, and may flexibly use the FPGA resources for different tasks and update the resources in real time.

Optionally, the computing device further includes a MCU, and the MCU is connected to the FPGA. Some FPGAs include MCUs, and some FPGAs do not include MCUs, so when the computing device according to the embodiment of the present disclosure includes the FPGA, it may further include the MCU to assist in managing the FPGA. Specifically, the MCU may be set inside the computing unit, connected to the FPGA, or set in the content of the storage unit, or set independently of the computing unit and the storage unit.

Optionally, the first virtual management unit circuit and the second virtual management unit circuit are connected to the external physical communication interface through a high-speed bus, which realize the connection between the computing unit and the storage unit through a high-speed bus at the same time, so that a single computing device may realize local high-speed storage and nearby computing. The connection between the computing unit and the storage unit by the high-speed bus ensures an IO speed of data. In a high concurrency mode, the high-speed reading and writing of multi-channel data may be realized, and the stored data may be arbitrarily structured offline according to service requirements, so as to facilitate the collaborative computing with other nodes.

Optionally, the external physical communication interface includes an optical fiber interface or an internet access. The optical fiber interface is a physical interface used to connect optical fiber cables. In the embodiment of the present disclosure, the computing unit is connected to the optical fiber interface, so that an external bandwidth of the computing device is guaranteed and real-time communication requirements are met.

In conclusion, the computing device in the embodiment of the present disclosure may adopt the FPGA structure with parallel computing unit and storage unit, and each hardware computing unit takes the FPGA array as a main computing and control carrier, and is assisted by a small number of MCU control units to assist management.

Figure 12:
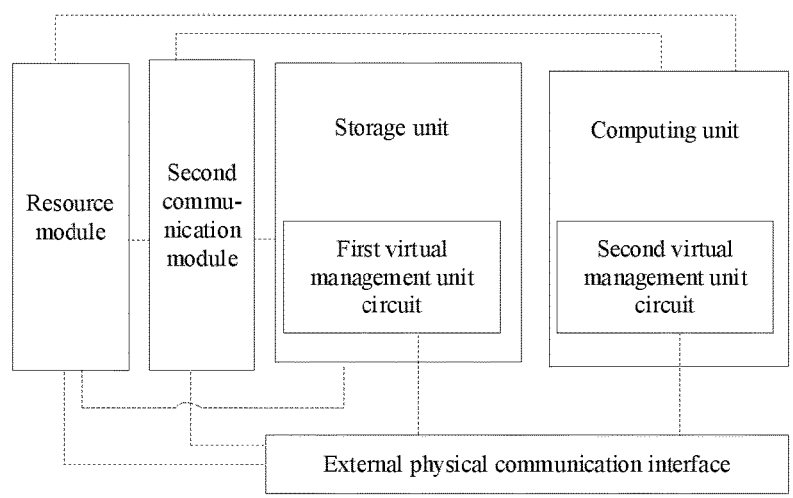
FIG. 12 is a structural block diagram of another computing device provided by an embodiment of the present disclosure.

Optionally, as shown in FIG. 12, the computing device further includes:

a second communication module connected to the storage unit, the computing unit and the external physical communication interface, and configured for determining a first surplus resource of a computing device to which the second communication module belongs at the current moment when receiving a resource request instruction; and a resource module connected to the storage unit, the computing unit, the external physical communication interface and the second communication module, and configured for acquiring required resource information according to the resource request instruction, wherein the required resource information includes at least one resource selection mode.

The resource module is further configured for allocating resources according to the first surplus resource and the resource selection mode included in the required resource information.

The resources include at least one of the storage units, the computing unit, a unit circuit in the storage unit, and a unit circuit in the computing unit.

From the above, it can be seen that the resources of the computing device may take the unit circuits of the computing device as granularity. For example, when the computing unit of the above-mentioned computing device includes the FPGA, the resources include Look-Up-Table (lut), Register Resource (reg), Digital Signal Processor (dsp), Memory Resource (mem), Input/Output (io) and communication bandwidth, or the like.

In the embodiment of the present disclosure, when receiving the resource request instruction sent by the network side, the computing device may count the surplus resource thereof at the current moment, that is, the first surplus resource, so as to determine whether the surplus resource thereof at the current moment may meet the resource request of the network side.

Optionally, the resource request instruction includes hardware type (IP core type), resource requirement information and communication requirement information for implementing the algorithm. Further, a data packet corresponding to the resource request instruction may be 1 kb in length and have a fixed format. In addition, the resource request instruction may be provided with an instruction frame header, and the computing device may read a content with a corresponding length according to the instruction frame header.

In addition, the required resource information includes at least one resource selection mode. That is, the network side may carry at least one resource selection mode corresponding to a function to be realized in this resource request in the resource request instruction, and the computing device may allocate resources for this resource request instruction according to the current surplus resource thereof and at least one resource selection mode indicated by the network side. It can be seen from the above that, in the embodiment of the present disclosure, the unit circuit in the computing device may be used as resource granularity for resource allocation, and the resource may be flexibly allocated according to the resource request instruction issued by the network side.

Optionally, the resource module includes:

a first determining submodule configured for determining a first resource selection mode that the first surplus resource meets and a second resource selection mode that the first surplus resource does not meet, wherein the first resource selection mode and the second resource selection mode are at least one resource selection mode included in the required resource information;

a second determining submodule configured for determining a second surplus resource after the first surplus resource meets the first resource selection mode; and a feedback submodule configured for feeding information of the first resource selection mode, the second resource selection mode and the second surplus resource back to a device that sends the resource request instruction.

In the embodiment of the present disclosure, the computing device may determine the resource selection mode that may be supported thereby and the resource selection mode that may not be supported thereby according to the at least one resource selection mode indicated by the network side and the current surplus resource of the computing device, calculate the surplus resource after allocating the resource according to the resource selection mode supported thereby, and report the resource selection mode supported thereby and the surplus resource after allocating the resource according to the resource selection mode supported thereby to the network side.

That is, when receiving the resource request instruction issued by the network side, the computing device acquires the required resource information from the resource request instruction (for example, there are three algorithms corresponding to the functions to be realized by the instruction, and the numbers of storage, algorithm and other units required by different algorithms are different, for example, the first algorithm needs 100 storage units, 200 algorithm units and 50 registers), the computing device may acquire whether the surplus resource thereof may realize one of the algorithms, for example, may realize the first algorithm. Then, the surplus resource after realizing the first algorithm may also be calculated. Then, the computing device reports which algorithm it may support and the subsequent surplus resource to the network side.

For example, when the computing unit included in the computing device includes FPGA, the network side issues an instruction to realize some AI reasoning function, which includes one set of hardware (i.e., IP core) and network structure capability requirements for deep learning computing. There are many choices for these according to different parallel situations, and the FPGA fills in feedback according to the current resource thereof, which ones may be supported and which ones may not. After processing the feedback from each FPGA device by the network, it is determined which FPGA device does the computing, and issues a computing instruction and the hardware (i.e., IP core) to realize the algorithm. The FPGA downloads the hardware (i.e., IP core) to realize the algorithm, complete the computing, and releases the resource.

The FPGA may also respond to resource requests of a plurality of different tasks at the same time. When resources permit, local resources are used to download IP, form corresponding data packets, and feed results of different tasks back.

In addition, the computing device may also directly report the first surplus resource counted when receiving the resource request instruction sent by the network side to the network side, and the network side determines the resource selection mode and the resource selection mode that the first surplus resource can and cannot meet, calculate the surplus resource of the computing device after allocating the resource to the computing device according to the resource selection mode that the first surplus resource may meet, and return these information to the computing device.

In addition, when the information of the first resource selection mode, the second resource selection mode and the second surplus resource is sent to the network side, the information may be directly fed back in packet, not stored, and sent according to a normal communication format (such as Ethernet mac layer protocol communication) or sent according to a newly defined frame format.

Optionally, when it is detected that target nodes in the plurality of nodes meet resource requirements of a preset type of service, the target nodes form at least one layer of autonomous domain, one layer of autonomous domain includes at least one autonomous domain, and one autonomous domain includes at least one of the target nodes.

The autonomous domain is a logical concept generated by optimizing resources for the service. The target node includes at least some nodes in the plurality of nodes in the network topology.

Figure 9:
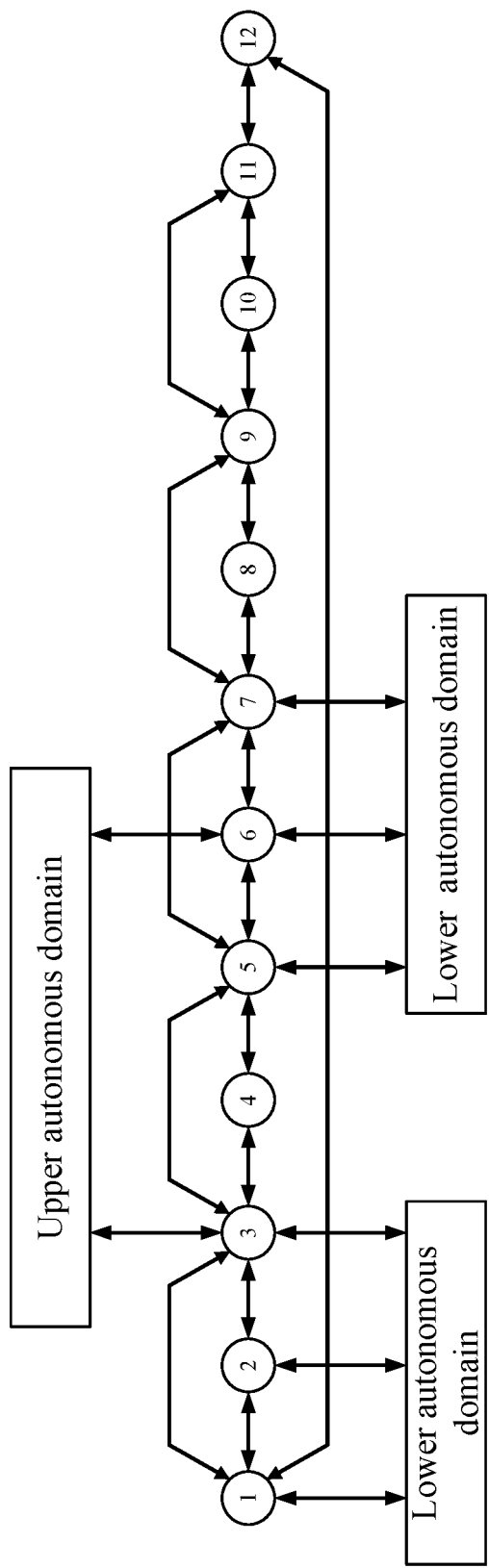
FIG. 9 is a schematic diagram of an autonomous domain formed by the network topology in the embodiment of the present disclosure.

Assuming that the network topology includes twelve nodes numbered from 1 to 12, in which the nodes numbered 1, 2 and 3 form a lower layer autonomous domain, the nodes numbered 5, 6 and 7 form another lower layer autonomous domain, the nodes numbered 3 and 6 form a layer of autonomous domain, that is, the network topology shown in FIG. 9 forms two layers of autonomous domains, the lower layer autonomous domain includes two autonomous domains, and the upper autonomous domain includes one autonomous domain. It may be understood that it is only exemplary and explanatory here, and it is not limited that the network topology only includes twelve nodes, and that the autonomous domain is only in the form shown in FIG. 9.

The resource requirements include data, bandwidth, computing power and algorithm, so that a corresponding type of service may be executed in the corresponding autonomous domain, and a time delay of processing time caused by searching the resources needed for executing the service in the whole network topology may be avoided. In addition, in the embodiment of the present disclosure, a time delay between any two nodes in one autonomous domain is smaller than a preset threshold, so a data transmission speed may be faster when some tasks are performed in one autonomous domain. Therefore, the autonomous domain formed by the network topology in the embodiment of the present disclosure logically groups the nodes according to the resource requirements corresponding to different service types.

Therefore, it can be seen that the network topology in the embodiment of the present disclosure automatically creates at least one layer of autonomous domain when it is detected that at least some of the nodes meet the resource requirements of the preset types of service, wherein one layer of autonomous domains includes at least one autonomous domain, and one autonomous domain includes at least two nodes, that is, the network topology in the embodiment of the present disclosure may group the nodes according to the actual resource requirements, so that the grouping of nodes may be dynamically changed. Therefore, the corresponding services may be executed in the autonomous domain that meets the actual resource requirements subsequently, so as to improve an execution speed of the service, and quicken the processing of the data with big explosion, which meets the explosive demand of massive data and large amount computing power caused by artificial intelligence and block-chain to a certain extent.

Optionally, a control node of a first-layer autonomous domains forms a second-layer autonomous domain, and the first-layer autonomous domains and the second-layer autonomous domain are adjacent two-layer autonomous domains.

For example, the first-layer autonomous domains include autonomous domains a, b, c and d, wherein the control node in each autonomous domain, for example, the control node in the autonomous domain a is a node A, the control node in the autonomous domain b is a node B, the control node in the autonomous domain c is a node C, and the control node in the autonomous domain d is a node D. Then, the nodes A, B, C and D form two second-level autonomous domains (for example, A and B form one second-layer autonomous domain, while C and D form one second-layer autonomous domain); then, control nodes of the two second-layer autonomous domains form a third-layer autonomous domain. For example, the control nodes of the two second-layer autonomous domains are A and C, the nodes A and C form the third-layer autonomous domain. The first-layer autonomous domains and the second-layer autonomous domain belong to adjacent autonomous domains, and the second-layer autonomous domain and the third-layer autonomous domain belong to adjacent autonomous domains.

From the above, it can be seen that the network topology of according to the embodiment of the present disclosure supports local self-organizing management, a self-organizing area is self-organized according to nearby nodes, and a single node may participate in multiple autonomous domains. Optionally, the nodes broadcast capability messages regularly, designate the control nodes of the autonomous domain by election, and an upper layer autonomous domain is elected among central control nodes, thus forming a network topology similar to a nervous system, wherein processing and storage modules of each node are analogously dendrites, external communication modules of each node are axons, transit nodes are synapses, and each node is a cell body.

Optionally, the network topology further includes at least one format conversion device for converting between a first data format and a second data format, and the format conversion device is connected between at least one node of the network topology and other networks;

wherein, the first data format is employed in the network topology to transmit data, and the second data format is employed in the other networks to transmit data. Moreover, the format conversion device may be regarded as an exoskeleton network connecting the network topology and other networks.

For example, the network topology is deployed in a single computer room or multiple computer rooms connected by transparent optical fibers, which may be regarded as a super local area network. It is possible to use a safer and more effective communication mode, without observing a traditional Internet protocol, and only need to install several format conversion devices at inlet/outlet ports to convert a TCP/IP format of the Internet into an instruction adopted by the network topology to transmit data, so that the network topology may be compatible with the existing network and share wide-area optical fiber resources with the existing Internet. If the network topology is deployed in a plurality of independent areas, passes through a public network, leads to a residential access network, connects to a wireless network, or the like, it is necessary to convert command formats between all the topology networks and the Internet.

Figure 10:
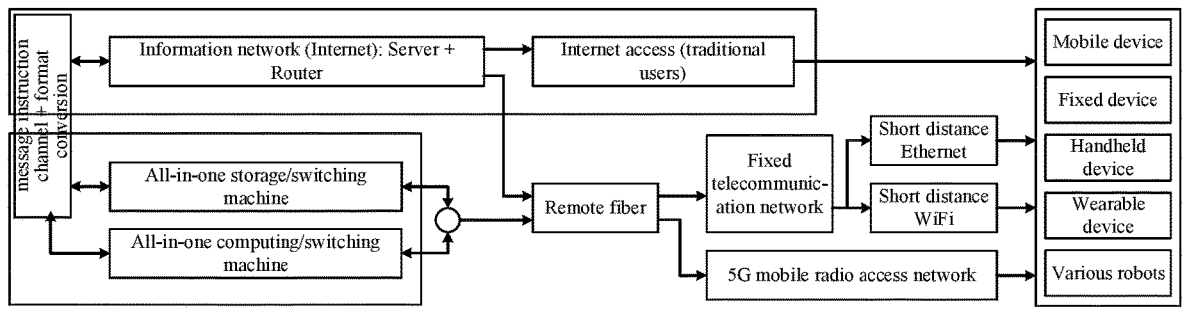
FIG. 10 is a structural schematic diagram of the network topology in the embodiment of the present disclosure connected to the existing Internet through an exoskeleton network.

For example, as shown in FIG. 10, an all-in-one storage/switching machine and an all-in-one computing/switching machine form nodes of a network topology. The network topology formed by such nodes is connected to the Internet through a signaling channel+a format conversion device. The network topology and the Internet may share optical fiber resources.

Therefore, it can be seen that the exoskeleton network may greatly reduce the cost of network construction, and the overall efficiency and scale will far exceed the traditional Internet. Next generation Internet is only a by-product of the above-mentioned network topology. When the above-mentioned network topology is large enough, the traditional Internet may naturally be marginalized.

In addition, the above network topology itself is a combination of computing and network. The services of the above network topology may be directly delivered to a user terminal by adding a conversion module in a 5G wireless network base station. The above network topology subverts the computer and Internet infrastructures at the same time, and will usher in a huge new era of artificial intelligence and sensory network.

Optionally, the network topology includes at least one layer of network structure, and the addressing module includes:

a first addressing submodule configured for addressing the first-type node in a first-layer network structure according to a first correlation parameter of the target data, and addressing the second-type node in the first-layer network structure according to a second correlation parameter of the target algorithm, wherein the first-layer network structure is a network structure of a layer that a node to which the addressing module belongs locates in;

a second addressing submodule configured for forwarding the first correlation parameter to a node of a the second-layer network structure the second-layer network structure when the first addressing submodule fails to address the first-type node, wherein the node of the second-layer network structure addresses the first-type node in the second-layer network structure after receiving the first correlation parameter; and a third addressing submodule configured for forwarding the second correlation parameter to the node of the second-layer network structure when the first addressing submodule fails to address the second-type node, wherein the node of the second-layer network structure addresses the second-type node in the second-layer network structure after receiving the second correlation parameter.

It can be seen from the above that, in the embodiment of the present disclosure, the first-type node is addressed in the first-layer network structure according to the first correlation parameter of the target data, and the second-type node is addressed in the first-layer network structure according to the second correlation parameter of the target algorithm, that is, the node that may provide the target data is subjected to content addressing in the layer according to the first correlation parameter of the target data, and the node that may provide the target algorithm is subjected to content addressing in the layer according to the second correlation parameter of the target algorithm. That is, addressing is carried out through the correlation parameters instead of the real address, thereby enhancing the security to a certain extent. In addition, according to the embodiment of the present disclosure, the content addressing is carried out in the layer, so that a content addressing range is reduced, and the overhead is reduced to a certain extent.

When the node that may provide the target data is not addressed in the first-layer network structure, the first correlation parameter is forwarded to the second-layer network structure, so that the second-layer network structure may continue to address the node that may provide the target data according to the first correlation parameter; when the node that may provide the target data is still not addressed in the second-layer network structure, the node in the second-layer network structure may continue to forward the first correlation parameter to other layer of network structures until the node that may provide the target data is addressed, or the whole time for addressing the node that may provide the target data reaches a preset time.

Similarly, when the node that may provide the target algorithm is not addressed in the first-layer network structure, the second correlation parameter is forwarded to the second-layer network structure, so that the second-layer network structure may continue to address the node that may provide the target algorithm according to the second correlation parameter; when the node that may provide the target algorithm is still not addressed in the second-layer network structure, the node in the second-layer network structure may continue to forward the second correlation parameter to other layer of network structures until the node that may provide the target algorithm is addressed, or the whole time for addressing the node that may provide the target algorithm reaches a preset time.

No matter in which layer the node that may provide the target data and the node that may provide the target algorithm are addressed, after addressing, the address of the node that may provide the target data and the address of the node that may provide the target algorithm need to be fed back to the node that needs to perform the target task.

It can be seen from the above that, the node that needs to perform the target task addresses the content of the node that may provide the target content according to the correlation parameter of the required target content (including target data and target algorithm) in the first-layer network structure, and when the node is not addressed in the first-layer network structure, directly forwards the correlation parameter to other layer of network structures, so as to address again in other layer of network structures until the node that may provide the target content is found. Therefore, it can be seen that in the embodiment of the present disclosure, in the process of addressing, only the content is addressed within the layer, and the parameters on which the addressing is based are directly forwarded between the layers, so that the content addressing range is shortened, the overhead is reduced, and the security requirements are met to a certain extent through the content addressing mode.

Each layer of network structure in the above-mentioned network topology may be provided with a control node or not. The control node stores the capability information of all nodes in this layer of network, that is, other nodes except the control node in this layer of network structure may periodically report their respective capability information to the control node of this layer.

According to the data transmission method of the embodiment of the present disclosure, the specific implementation modes are different when the control node is set and not set in each layer of network structure.

Specifically, for the case that no control node is set in each layer of network structure:

Optionally, the first addressing submodule includes:

a broadcasting unit configured for broadcasting the first correlation parameter and the second correlation parameter in the first-layer network structure.

In the embodiment of the present disclosure, when the control node is not disposed in the first-layer network structure, the first node needing to execute the target takes may be controlled by the broadcasting unit to directly broadcast the first correlation parameter in the first-layer network structure, and other nodes in the first-layer network structure may determine whether they may provide the target data after receiving the first correlation parameter.

Optionally, the second addressing submodule includes:

a first sending unit configured for controlling a first node to send the first correlation parameter to a third node through a path between the first node and the third node, wherein the first node is a node that needs to perform the target task, the third node, after receiving the first correlation parameter, forwards the first correlation parameter to a fourth node, the fourth node is located in the second-layer network structure, the third node and the first node are both located in the first-layer network structure, and the third node is connected to the fourth node.

Therefore, it can be seen that in the embodiment of the present disclosure, the first-layer network structure and the second-layer network structure realize communication through the connection between the third node and the fourth node.

In addition, if feedback information of other nodes in the first-layer network structure is not received within a preset time period after the broadcasting unit controls the node that needs to perform the target task (i.e., first node) to broadcast the first correlation parameter, it means that there is no node that may provide the target data in the first-layer network structure, and it is desirable to continue searching in other layers. In this case, the first sending unit may control the first node to send the instruction information to the third node according to a communication link between the first node and the third node, such that the third node may forward the first correlation parameter to the fourth node in the second-layer network structure, so that the fourth node may continue addressing the node that may provide the target data in the second-layer network structure.

Moreover, after receiving the first correlation parameter sent by the third node, the fourth node broadcasts the first correlation parameter in the second-layer network structure. After receiving the first correlation parameter, other nodes in the second-layer network structure except the fourth node may determine whether they may provide the target data. If so, the other nodes except the fourth node may feed respective addresses thereof back to the fourth node through a connection from the other nodes except the fourth node to the fourth node, such that the fourth node may further forward the addresses to the third node, so that the third node further forwards the addresses to the first node through a communication link from the third node to the first node.

Figure 3:
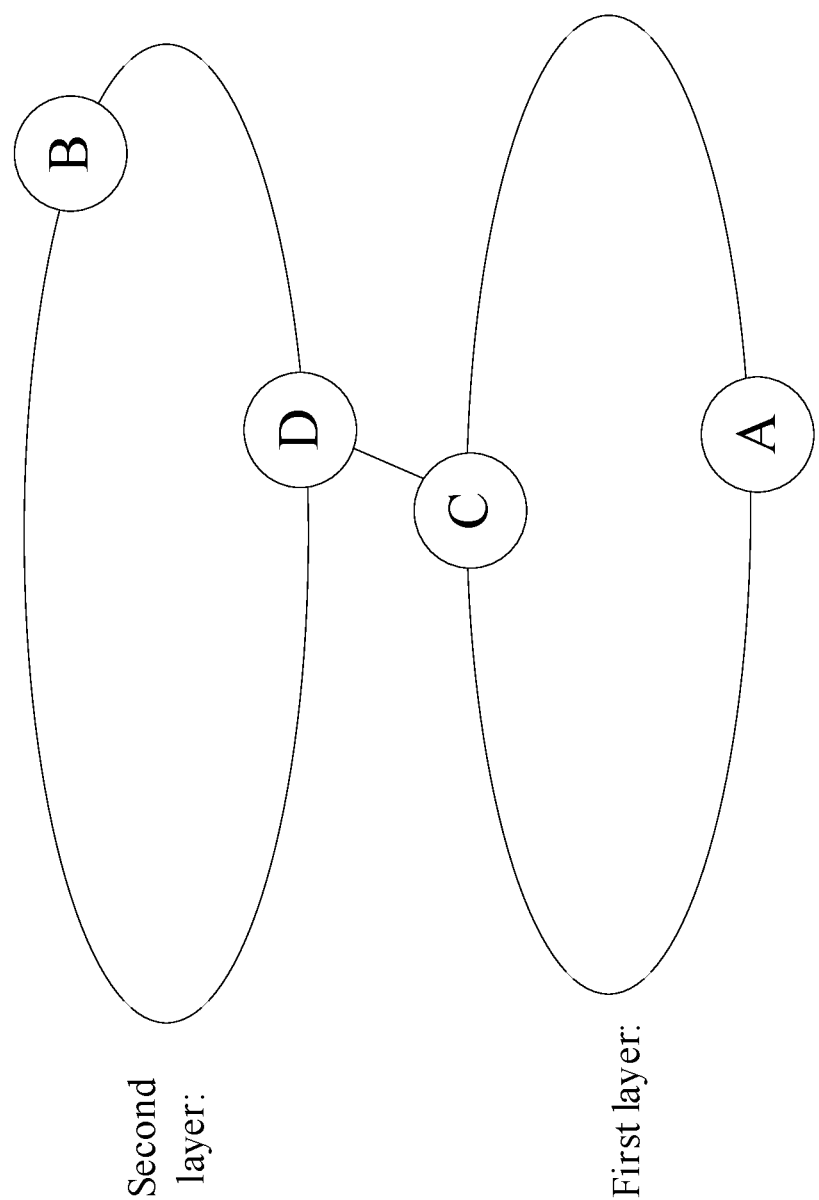
FIG. 3 is a first distribution schematic diagram of nodes involved in an addressing process in the network topology in an embodiment of the present disclosure.

In conclusion, when no control node is set in each layer of the network topology, the process of addressing the node capable of providing the target data in the embodiment of the present disclosure may be shown in FIG. 3 for example. That is, the first node A broadcasts the first correlation parameter in the first layer, and after that the first node A does not receive feedback from other nodes in the first layer within a preset time, the first node A sends instruction information to the third node C through a path to the third node C. After receiving the instruction information, the third node C sends the first correlation parameter to the fourth node D. The fourth node D broadcasts the first correlation parameter in the second layer, thereafter, the second node B receives the first correlation parameter and determines that the second node B may provide the target content itself, and the second node B feeds the address thereof to the fourth node D through a path to the fourth node D. The fourth node D forwards the address of the second node B to the third node C. The third node C sends the address of the second node B to the first node A through a path to the first node A. For the sake of understanding, only the first node to the fourth node is drawn in the first layer and the second layer in FIG. 3.

Optionally, the third addressing submodule includes:

a fifth sending unit configured for controlling a path between the first node and the third node to send the second correlation parameter to the third node, wherein the third node receives the second correlation parameter and forwards the second correlation parameter to the fourth node, the fourth node is located in the second-layer network structure, both the third node and the first node are located in the first-layer network structure, and the third node is connected to the fourth node.

When the feedback information of other nodes in the first-layer network structure is not received within the preset time period after the broadcasting unit controls the node that needs to perform the target task (i.e., first node) to broadcast the second correlation parameter, it means that there is no node that may provide the target algorithm in the first-layer network structure, and it is desirable to continue searching in other layers. In this case, the fifth sending unit may control the first node to send the instruction information to the third node according to a communication link between the first node and the third node, such that the third node forwards the second correlation parameter to the fourth node in the second-layer network structure, so that the fourth node may continue addressing the node that may provide the target algorithm in the second-layer network structure.

Moreover, after receiving the second correlation parameter sent by the third node, the fourth node broadcasts the second correlation parameter in the second-layer network structure. After receiving the second correlation parameter, other nodes in the second-layer network structure except the fourth node may determine whether they may provide the target data. If so, the other nodes except the fourth node may feed respective addresses thereof back to the fourth node through a connection from the other nodes except the fourth node to the fourth node, such that the fourth node may further forward the addresses to the third node, so that the third node further forwards the addresses to the first node through a communication link from the third node to the first node.

For the example of the process of addressing the node capable of providing the target algorithm in the embodiment of the present disclosure, please refer to the above example of addressing the node capable of providing the target data, which will not be repeated here.

Optionally, if there are the node capable of providing the target data and the node capable of providing the target algorithm in the first-layer network structure, the node capable of providing the target data in the first-layer network structure may feed the address thereof back to the first node through a path with the first node, and similarly, the node capable of providing the target algorithm in the first-layer network structure may feed the address thereof back to the first node through a path with the first node.

Figure 4:
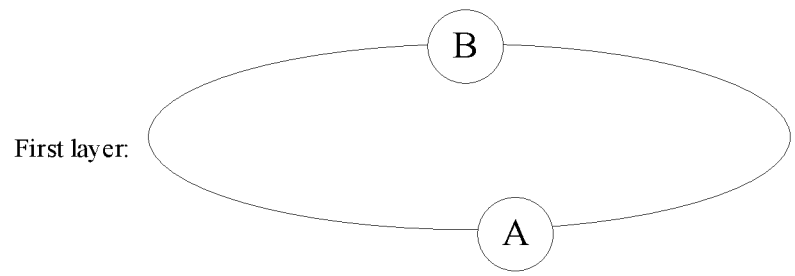
FIG. 4 is a second distribution schematic diagram of the nodes involved in the addressing process in the network topology in the embodiment of the present disclosure.

Therefore, it can be seen that when no control node is set in each layer of the network topology, the process of addressing the node capable of providing the target data in the embodiment of the present disclosure may also be shown in FIG. 4 for example. In other words, the first node A broadcasts the first correlation parameter in the first layer; the second node B receives the first correlation parameter and determines that the second node B may provide the target data itself, the second node B feeds the address thereof back to the first node A through a path to the first node A. For the sake of understanding, only the first node and the second node are drawn in the first layer in in FIG. 4.

Similarly, the example of the process of addressing the node capable of providing the target algorithm in the embodiment of the present disclosure may also be shown in FIG. 4, and the specific process may refer to the above process of addressing the node capable of providing the target data, which will not be repeated here.

Specifically, for the case that no control node is set in each layer of network structure:

Optionally, a first control node is disposed in the first—layer network structure, and the first control node stores capability information of the nodes in the first—layer network structure; and the first addressing submodule includes:

a second sending unit configured for controlling the first node to send the first correlation parameter to the first control node;

wherein, the first node is a node that needs to perform the target task, and the first control node, after receiving the first correlation parameter, addresses the first-type node according to the first correlation parameter and the capability information of the nodes in the first-layer network structure.

In the embodiment of the present disclosure, when the first control node is set in the first-layer network structure, because the first control node stores the capability information of the nodes in the first-layer network structure, the first control node itself may determine which node or nodes in the first-layer network structure may provide the target data. Therefore, the first node only needs to send the first correlation parameter to the first control node.

Optionally, a second control node is disposed in the second-layer network structure, and the second control node stores capability information of the nodes in the second-layer network structure; wherein, the second control node is configured for receiving the first correlation parameter sent by the first control node when failing to address the first-type node, and addressing the first-type node according to the first correlation parameter and the capability information of the nodes in the second-layer network structure.

The first control node decides according to the capability information of the nodes in the first-layer network structure, when there is no node capable of providing the target data in the first-layer network structure, the first control node needs to send the first correlation parameter to the second control node in the second-layer network structure, such that the second control node may determine whether there is a node capable of providing the target data in the second-layer network structure.

In addition, if the first control node and the second control node are not directly connected (that is, the first control node is not directly connected to the node of the second-layer network structure, or the second control node is not directly connected to the node of the first-layer network structure), for example, the third node of the first-layer network structure is connected to the fourth node of the second-layer network structure, and neither the third node nor the fourth node is a control node, in the process that the first control node sends the first correlation parameter to the second control node, the first control node needs to send the first correlation parameter to the third node through a communication link with the third node first. Then, the third node forwards the first correlation parameter to the fourth node. Finally, the fourth node sends the first correlation parameter to the second control node through a communication link with the second control node.

Moreover, after receiving the first correlation parameter, the second control node may decide which node or nodes in the second-layer network structure may provide the target data according to the capability information of the nodes in the second-layer network structure, and when there is a node that may provide the target data, feed an address of the node back to the first control node in the first-layer network structure, such that the first control node may send the address to the first node.

Figure 5:
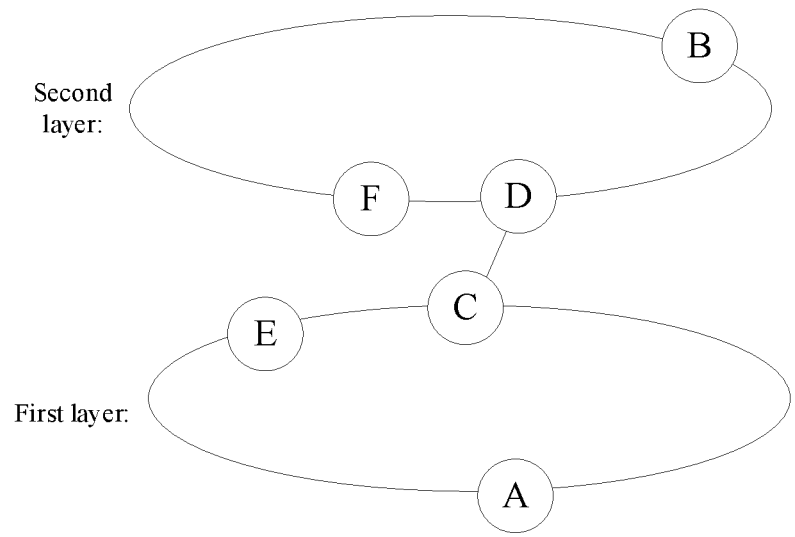
FIG. 5 is a third distribution schematic diagram of the nodes involved in the addressing process in the network topology in the embodiment of the present disclosure.

In conclusion, when the control node is set in each layer of the network topology, the process of addressing the node capable of providing the target data in the embodiment of the present disclosure may be shown in FIG. 5 for example. That is, when the first node A sends the first correlation parameter to the first control node E, and the first control node E decides that there is no node in the layer that may provide the target content according to the capability information of the nodes in the first layer, the first control node E sends the first correlation parameter to the third node C through a path with the third node C. The third node C forwards the first correlation parameter to the fourth node D. The fourth node D forwards the first correlation parameter to the second control node F in the second layer. If the second control node F decides that there is a node that may provide the target content in the second layer, i.e., the second node B, according to the capability information of the nodes in the second layer, the second control node F sends the address of the second node B to the fourth node D through a path with the fourth node D. The fourth node D forwards the address of the second node B to the third node C. The third node C sends the address of the second node B to the first control node E through a path with the first control node E, so that the first control node E may send the address of the second node B to the first node A through a path with the first node A. For the sake of understanding, only the first node to the fourth node as well as the first control node and the second control node are drawn in the first layer and the second layer in FIG. 5.

Optionally, a first control node is disposed in the first-layer network structure, and the first control node stores capability information of the nodes in the first-layer network structure; and the third addressing submodule includes:

a sixth sending unit configured for controlling the first node to send the second correlation parameter to the first control node;

wherein, the first node is a node that needs to perform the target task, and the first node, after receiving the second correlation parameter, addresses the second-type node according to the second correlation parameter and the capability information of the nodes in the first-layer network structure.

In the embodiment of the present disclosure, when the first control node is set in the first-layer network structure, because the first control node stores the capability information of the nodes in the first-layer network structure, the first control node itself may determine which node or nodes in the first-layer network structure may provide the target algorithm. Therefore, the sixth sending unit is only needed to control the first node to send the second correlation parameter to the first control node;

Optionally, a second control node is disposed in the second-layer network structure, and the second control node stores capability information of the nodes in the second-layer network structure; wherein, the second control node is configured for receiving the second correlation parameter sent by the first control node when failing to address the second-type node, and addressing the second-type node according to the second correlation parameter and the capability information of the nodes in the second-layer network structure.

The first control node decides according to the capability information of the nodes in the first-layer network structure, when there is no node capable of providing the target algorithm in the first-layer network structure, the first control node needs to send the second correlation parameter to the second control node in the second-layer network structure, such that the second control node may determine whether there is a node capable of providing the target algorithm in the second-layer network structure.

In addition, if the first control node and the second control node are not directly connected (that is, the first control node is not directly connected to the node of the second-layer network structure, or the second control node is not directly connected to the node of the first-layer network structure), for example, the third node of the first-layer network structure is connected to the fourth node of the second-layer network structure, and neither the third node nor the fourth node is a control node, in the process that the first control node sends second correlation parameter to the second control node, the first control node needs to send the second correlation parameter to the third node through a communication link with the third node first. Then, the third node forwards the second correlation parameter to the fourth node. Finally, the fourth node sends the second correlation parameter to the second control node through a communication link with the second control node.

Moreover, after receiving the second correlation parameter, the second control node may decide which node or nodes in the second-layer network structure may provide the target algorithm according to the capability information of the nodes in the second-layer network structure, and when there is a node that may provide the target algorithm, feed an address of the node back to the first control node in the first-layer network structure, such that the first control node may send the address to the first node.

In conclusion, when the control node is set in each layer of the network topology, the process of addressing the node that may provide the target algorithm in the embodiment of the present disclosure may be exemplified as shown in FIG. 5. Please refer to the example of the process of addressing the node that may provide the target data for details, which will not be repeated herein.

As can be seen from the above, when the control node is set in each layer of the network topology, the first correlation parameter of the target content is broadcast by the control node, and the address of the node that may provide the target content may be fed back by the control node, so that the node that needs the target content does not need to know the node that provides the target content, and the node that provides the target content does not need to know which node to provide the target content for, so that the security in the addressing process may be further improved. The target content is the target data or the target algorithm mentioned above.

Optionally, when the control node is set in each layer of the network topology, the first node sends the first correlation parameter to the first control node of the first-layer network structure, and the first control node determines whether there is a second node capable of providing the target content in the first-layer network structure according to the first correlation parameter and the capability information of the nodes in the first-layer network structure. If so, the first control node sends an address of the second node to the first node.

Figure 6:
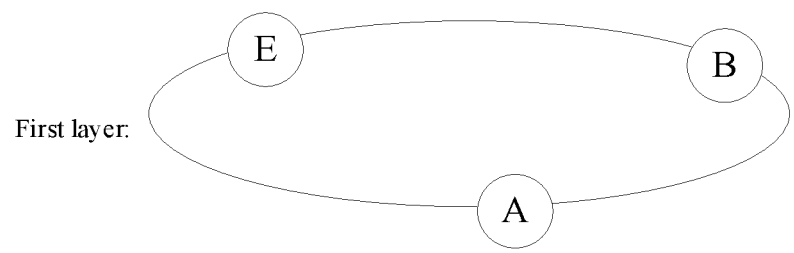
FIG. 6 is a fourth distribution schematic diagram of the nodes involved in the addressing process in the network topology in the embodiment of the present disclosure.

Therefore, it can be seen that when the control node is set in each layer of the network topology, the process of addressing the second node capable of providing the target data in the embodiment of the present disclosure may also be shown in FIG. 6 for example. That is, when the first node A sends the first correlation parameter to the first control node E in the first layer, and the first control node E decides that there is the second node B in the first layer that may provide the target content, the first control node E feeds the address of the second node B back to the first third node A through a path to the first node A. For the sake of understanding, only the first node, the second node and the first control node are drawn in the first layer and the second layer in FIG. 6. Similarly, the example of the process of addressing the node capable of providing the target algorithm in the embodiment of the present disclosure may also be shown in FIG. 6, and the specific process may refer to the above process of addressing the node capable of providing the target data, which will not be repeated here.

In conclusion, in the embodiment of the present disclosure, content addressing is adopted in the layer, and the parameter on which content addressing is performed is forwarded directly between the layer and the layer, thereby establishing a communication connection. After a link composition is completed, service contents are partitioned according to the addresses and processing functions, the data is marked and sent, a transit node only carries out processing divided for the transit node and reconstitutes the processed packet, and the rest of the content is passthrough. The content is processed during transmission, and no more data is transmitted after each processing, but knowledge generated by the processed data is transmitted.

Figure 7:
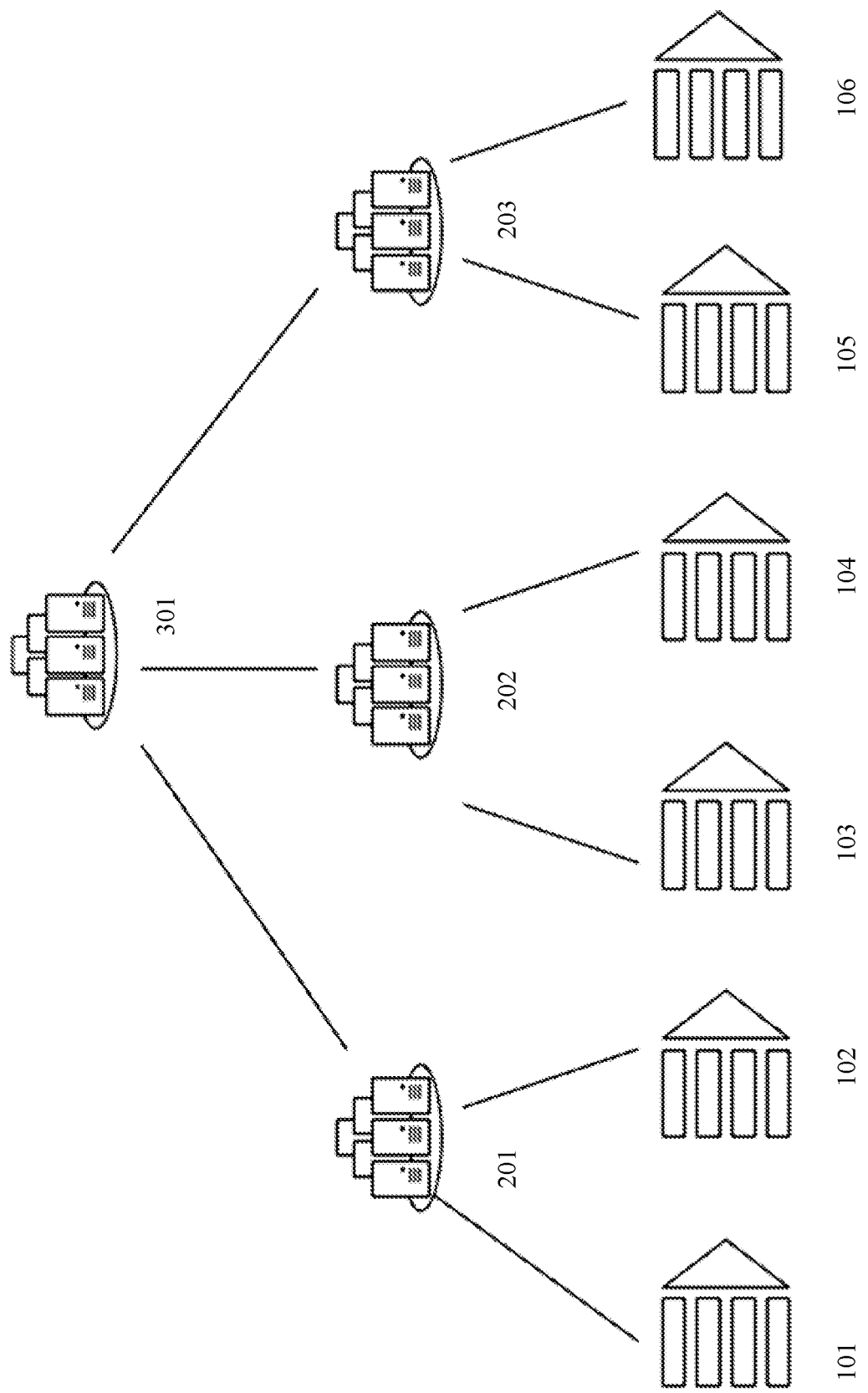
FIG. 7 is a schematic diagram of an example of the network topology in practical application.

Moreover, in a practical disclosure scenario as shown in FIG. 7, a network topology of one large company includes a three-layer network structure, wherein the first layer includes service hall nodes 101-106, the second layer includes regional branch company nodes 201-202, and the third layer includes provincial company node 301. Each service hall node is connected to different types of devices, mainly including a face recognition camera, a crowd monitoring camera, a smoke sensor and an air quality sensor. These devices collect data separately and store the data in the corresponding service hall nodes.

When the provincial company node needs real-time data, for example, the provincial company node needs to find someone accurately, the provincial company node addresses a node that may provide a related content of the task in the second layer, for example, the provincial company node may send a task package to the regional branch company nodes in the second layer (or broadcast the task package), and each regional branch company node may determine whether the task package is the task belonging to the node. Then, the regional branch company node that matches the task sends the task package to the service hall node connected therewith, so that the service hall node that receives the task package parses the data, acquires a service type being firmware update, a data type being code, and a specific device number, and executes the task according to the acquired information, and gives feedback after the task is completed.

Specifically, the task package sent by the provincial company node includes: real-time report, data type video, device type, and contents being a photo and number of the monitored person. After receiving the task package, the service hall node may execute the following process:

The service office node acquires a netlist file, which is downloaded by an on-board management ARM through a joint test workgroup (jtag) interface, and when the download is completed, a downloading module of the service office node generates a confirmation message and sends the confirmation message to a communication module of the service office node, such that the communication module of the service office node fills in the content and feed the content back according to a 1 kB frame format. After feedback, the ARM of the service hall node sends an instruction to a FPGA of the service hall node, so that a communication module of the FPGA is opened, such that the FPGA may directly receive IP data of a camera connected to the service hall node (wherein the camera connected to the service hall node runs a User Datagram Protocol (UDP) mode). After receiving the data, the FPGA communication module of the service hall node finishes decoding through a FPGA video decoding module, and hands over to a downloaded AI module for reasoning. The AI module feeds back a discovery message, triggers a forwarding mode, records a time point, and forwards the latest video within 1 minute in a double data rate (DDR) to the regional branch company nodes through the FPGA communication module. The regional branch company nodes may also make further analysis according to the real-time reports received from various places.

The FPGA maintains a file system through the ARM, and the video content is directly input into a hard disk by the FPGA. The FPGA and the ARM are communicated through a Peripheral Component Interconnect Express (PCIE) interface. In addition, the service hall nodes include multiple FPGAs, and the FPGAs here are only responsible for this scene task, while other daily monitoring tasks are executed by other FPGAs concurrently.

Moreover, the data transmission method may further include:

the storage unit further includes: a seventh sending subunit configured for reporting the target data to one node of the second-layer network structure periodically.

For example, the network topology of the large company shown in FIG. 7 includes a three-layer network structure. When the service hall nodes periodically report device data, the specific implementation process may be described in the following first step to the fourth step:

First step: the service hall nodes monitor data, service type, device number and data type every day, and store the same in the local. For example, VIP customer related videos may be stored according to service VIP statistics, a first face camera and video source files; or the monitored VIP in-store time statistics may be stored according to the service VIP statistics, the first face camera and in-store time; or the monitored clerk in-store time statistics is stored according to service clerk statistics, the first face camera and the in-store time.

Second step: the service office nodes automatically assemble packages according to a pre-set report content (which is mainly statistical content) at a specified time, wherein a package length is unified by 1 kB. The existing network may still be configured for transmission, and an address layer is only configured for content identification. There are ten gateways in the service hall nodes, which are responsible for Transmission Control Protocol (TCP)/IP encapsulation and docking with the existing network. This is a standard TCP/IP protocol, and will not be elaborated herein.

Third step: the regional branch company nodes perform local statistics according to the content reported by each service hall node, generate reports, and use messages (see Table 1 for the message format) to continue reporting. There are logical loops between the regional branch company nodes, and each branch company node has data transmission outlets for upper and low layers.

Fourth step: the provincial company node counts the content, such as an average in-store time of VIP, working hours of employees, a passenger flow of each store, and the like.

TABLE 1

Message format

| 8-bit national identity | 8-bit provincial identity | 16-bit regional identity | 16-bit service hall identity | 16-bit device identity |
|---|---|---|---|---|
| 8-bit service type identity | | 16-bit data type identity | 8-bit device type identity | Reservation |
| | | Data + error correction + verification | | |

Optionally, the network topology defines a path by giving any two nodes (origin and destination) macroscopically. Therefore, when the first node (i.e., the origin) sends data to the second node (i.e., the destination), it is first determined whether the origin and the destination are at the same network level. If the origin and the destination are at the same network level, same layer forwarding is performed. If the origin and the destination are not at the same network level, forwarding to the higher or lower level may be performed by vertical bridging between layers.

Optionally, the node address of the network topology includes a field corresponding to each layer. For example, when the network topology includes a three-layer network structure, the network topology may be divided into a high layer, a middle layer and a low layer. When sending a data packet from the first node to the second node, the specific process may be as follows:

If three addresses of the two nodes are all equal, it means that the data packet arrives at the destination, the switcher of the second node accepts the data packet, which means that the exchange function ends and performing the possible storage and computing operation subsequently. If the two nodes are not completely equal, a further analysis is required; if the addresses of the high layers of the two nodes are different, forwarding the data packet to the high layer network structure by bridging. Furthermore, if the node is not directly connected to the high layer, the data packet is forwarded along the same level until a connecting node of the high layer network structure is found. If a target address of the data packet is equal to a high-level address of a local port, but the address of this layer is different, according to a random address mark of this layer, the data packet is sent along an address increasing or decreasing direction of this layer until a local match is found. If the addresses of the high level and this layer of the data packet are equal to the local port, but the addresses of the low layer are different, the data packet is forwarded to the low layer by bridging. If the node is not directly connected to the low layer, the data packet is forwarded along the same level until the connecting node of the low layer network is found.

Optionally, the task processing module includes:

a selection submodule configured for selecting a node that provides one set of the target data as a first target node from at least one first-type node addressed by the addressing module, and selecting a node that provides one set of the target algorithm as a second target node from at least one second-type node addressed by the addressing module; and a processing submodule configured for interacting with the first target node and the second target node, so that the second target node processes the target data provided by the first target node by using the target algorithm.

The target data includes at least one data, for example, may include A and B data. The target algorithm includes at least one algorithm, for example, may include C and D algorithms. In the embodiment of the present disclosure, the target data corresponds to the target algorithm, that is, the target data is the data required to execute the target algorithm. For example, if the target task to be executed is to execute the C algorithm and the D algorithm successively on the A and B data, the A and B data correspond to the C and D algorithms.

Moreover, in the embodiment of the present disclosure, the data and the algorithms are distributed to the network, instead of uniformly storing the data to the node that needs to perform the target task, or executing the target algorithm by the node that needs to execute the target algorithm by itself, but are distributed to the node with the processing capability of the target algorithm to execute, that is, the embodiments of the present disclosure combine distributed storage with distributed computing, which may reduce the capability of a single node in the network topology, thereby reducing the design cost of a single node and the design cost of the whole network topology.

In addition, the network topology includes a plurality of nodes. Therefore, it is possible that a plurality of nodes may provide the target data and a plurality of nodes may execute the target algorithm. Moreover, it is possible that the target data is distributed on the plurality of node, and the target algorithm is also distributed on the plurality of nodes. However, only the node that provides one set of the target data and the node that provides one set of the target algorithm are needed to perform the target task.

Optionally, the task processing device further includes:

a task splitting module configured for, according to capability information of the nodes in the network topology, splitting the task to be executed into at least one subtask, and determining one of the at least one subtask as the target task.

Therefore, it can be seen that, in the embodiment of the present disclosure, when the task to be executed involves a complex algorithm, the task may be split according to the capability information of each node in the network topology (i.e., which algorithm processing capabilities each node has), so as to obtain multiple subtasks, wherein the algorithm of one subtask is provided by one node.

For each subtask obtained by splitting, there is a corresponding execution sequence, such as splitting to obtain a subtask I, a subtask II and a subtask III. The data and algorithms required by the subtask I and the subtask II do not conflict with each other and may be executed concurrently. The data required by the subtask III is data generated by the subtask I and the subtask II, so the subtask I and the subtask II may be executed concurrently. For the subtask I and the subtask II, the nodes that may provide data and algorithms in the network topology may be acquired first, one node that may provide data and one node that may provide algorithms are selected, and the node that provides algorithms process the data provided by the node that provides data, and store the processed data. In addition, when executing the subtask III, the nodes that execute the algorithms of the subtask I and the subtask II are clearly defined, nodes in the network topology that may provide an algorithm corresponding to the subtask III may be determined first, and one node that may provide the algorithm corresponding to the subtask III may be selected, and the data required by the subtask III stored in the nodes that execute the algorithms of the subtask I and the subtask II is processed to execute the whole task.

Specifically, for example, the first five minutes of a 10-minute source video need to be processed by a first model, and the last five minutes of the source video are processed by a second model, and the videos processed by the two models are synthesized, the task may be divided into three subtasks, namely:

subtask I: processing the first five minutes of the source video by the first model;

subtask II: processing the last five minutes of the source video by the second model; and subtask III: synthesizing the videos.

For the subtask I: firstly, it is desirable to acquire nodes that may provide the source video and the nodes that may provide the first model in the network topology, so as to select one node that may provide the source video and one node that may provide the first model, and transmit a video stream of the first five minutes of the source video to the selected node that may provide the first model.

For the subtask II: since one node that may provide the source video is selected for the subtask I, in the processing procedure of the subtask II, it is desirable to acquire nodes that may provide the second model in the network topology, therefore selecting one node that may provide the second model, so as to transmit a video stream of the last five minutes of the source video to the selected node that may provide the second model.

For the subtask III: because the data required by the subtask III is the data obtained after executing the subtask I and the subtask II, in the processing procedure of the subtask III, it is desirable to acquire nodes that may synthesize videos in the network topology, so as to select one node that may synthesize videos to synthesize the data output by the node providing the first model in the subtask I and the data output by the node providing the second model in the subtask II.

Therefore, it can be seen that, according to the embodiment of the present disclosure, tasks with complex algorithms may be split, so that the algorithms of each task are distributed in the network instead of being executed by one node at the same time, which may not only reduce the capability requirement of a single node, but also shorten the task processing time.

Optionally, the selection submodule includes:

a combining unit configured for acquiring a combination formed by the node that provides one set of target data and the node that provides one set of target algorithm; and a selection unit configured for selecting one target combination according to capability information of each combination, determining the node that provides one set of target data in the target combination as the first target node, and determining the node that provides one set of target algorithm in the target combination as the second target node;

wherein, the capability information of the combination includes at least one of a time delay from the node that provides one set of target data to the node that provides one set of target algorithm in the combination, a duration needed for the node that provides one set of target algorithm to execute the target algorithm, and a cache space size of the node that provides one set of target algorithm.

It should be noted that if the task is not split, one set of target algorithm may be provided by a plurality of nodes. Therefore, in this case:

in a first aspect, if the node that provides one set of target data also includes a plurality of nodes, the time delay from the node that provides one set of target data to the node that provides one set of target algorithm may be a difference or an average value of the time delay from each node that provides the target data to each node that provides the target algorithm. For example, the node that provides one set of target data include nodes a and b, and the node that provides one set of target algorithm nodes are c and d nodes, the difference or average value of the time delays of a-c, b-c, a-d and b-d may be used as the time delay between the set of nodes that provide the target data and the set of nodes that provide the target algorithm.

In a second aspect, the duration required for the node that provides one set of target algorithm to execute the target algorithm may be a sum or an average value of the duration required for executing the respective provided algorithm in the set.

In a third aspect, the cache space size of the node that provides one set of target algorithm may be a sum or an average value of the cache space of the node that provides the target algorithm in the set.

If the task is split, one set of target algorithm is provided by one node. Therefore, in this case:

in a first aspect, if the node that provides one set of target data also includes a plurality of nodes, the time delay from the node that provides one set of target data to the node that provides one set of target algorithm may be a difference or an average value of the time delay from each node that provides the target data to the node that provides the target algorithm. For example, the node that provides one set of target data include nodes a and b, and the node that provides one set of target algorithm nodes is a c node, the difference or average value of the time delays of a-c and b-c may be used as the time delay between the set of nodes that provide the target data and the node that provides the target algorithm.

In a second aspect, the duration required for the node that provides one set of target algorithm to execute the target algorithm is the duration required by the node that provides the target algorithm to execute the target algorithm.

In a third aspect, the cache space size of the node that provides one set of target algorithm may be a cache space of the node that provides the target algorithm.

In addition, for the above combinations, for example, the target data includes two A and B data, which may be provided by the a and b nodes in the network topology, and the target algorithm includes the C algorithm, which may be provided by the c and d nodes in the network topology, and the combinations that may be obtained are as follows:

combination I: a, b and c; and
combination II: a, b and d.

The capability information of the above four combinations may be acquired, and one combination may be selected according to the respective capability information of the four combinations, so that the target data provided by the node that provides the target data in the combination is processed by the node that provides the target algorithm in the selected combination by using the target algorithm.

In addition, the target combination is the combination with the strongest capability among all the combinations formed by the node that provides one set of target data and the node that provides one set of target algorithm. The capability of the combination may be expressed by at least one of the time delay from the node that provides one set of target data to the node that provides one set of target algorithm, the duration required for the node that provides one set of target algorithm to execute the target algorithm, and the cache space size of the node that provides one set of target algorithm, for example, the smaller the time delay from the node that provides one set of target data to the node that provides one set of target algorithm, the smaller the duration required for the node that provides one set of target algorithm to execute the target algorithm, and the larger the cache space of node that provides one set of target algorithm, the stronger the capability of the combination.

Optionally, the selection unit includes:

a first selection subunit configured for selecting a combination corresponding to a minimum value of the time delay from the node that provides one set of target data to the node that provides one set of target algorithm in the combination as the target combination;

or, a second selection subunit configured for selecting a combination corresponding to a minimum value of the duration needed for the node that provides one set of target algorithm to execute the target algorithm in the combination as the target combination;

or, a third selection subunit configured for selecting a combination corresponding to a maximum value of the cache space of the node that provides one set of target algorithm in the combination as the target combination;

or, a fourth selection subunit configured for selecting a combination corresponding to a minimum value of a sum of the time delay from the node that provides one set of target data to the node that provides one set of target algorithm in the combination and the duration needed for the node that provides one set of target algorithm to execute the target algorithm in the combination as the target combination;

or, a fifth selection subunit configured for selecting a combination corresponding to a minimum value of a first ratio in the combination as the target combination, wherein the first ratio is a ratio of the time delay from the node that provides one set of target data to the node that provides one set of target algorithm in the combination to a value of the cache space size of the node that provides one set of target algorithm in the combination;

or, a sixth selection subunit configured for selecting a combination corresponding to a minimum value of a second ratio in the combination as the target combination, wherein the second ratio is a ratio of the duration needed for the node that provides one set of target algorithm to execute the target algorithm to the value of the cache space size of the node that provides one set of target algorithm in the combination.

It can be seen from the above that, in the embodiment of the present disclosure, any one of the above six selection subunits may be used to select the target combination. It may be understood that the specific way of selecting the target combination is not limited herein, but may also be other ways of selecting according to the capability information of the combination.

Optionally, the processing submodule includes:

a third sending unit configured for sending first instruction information to the first target node, wherein the first instruction information is configured for instructing the first target node to send the target data to the second target node;

a fourth sending unit configured for sending second instruction information to the second target node, wherein the second instruction information is configured for instructing the second target node to process the target data by using the target algorithm; and a receiving unit configured for receiving the data sent by the second target node acquired after processing the target data by using the target algorithm.

In the embodiment of the present disclosure, after selecting the node that provides one set of target data (i.e., the first target node) and the node that provides one set of target algorithm (i.e., the second target node), the node that needs to perform the target task (i.e., the first node) sends the instruction information to the first target node, such that the first target node sends the stored target data to the second target node, and the second target node processes the target data by using the target algorithm, so as to return the processed data to the node that needs to perform the target task.

It should be noted that if the task is not split, one set of target algorithm may be provided by a plurality of nodes. Therefore, in this case:

if the node that provides one set of target data includes a plurality of nodes, the plurality of nodes that provide one set of target data transmit the corresponding data to the corresponding algorithm nodes. For example, the nodes that provide one set of target data include a and b nodes, and the nodes that provide the target algorithm include c and d nodes. The data provided by the node a needs to be processed by the node c, and the data provided by the node b needs to be processed by the node d. Then, the node a needs to transmit the data to the node c, and the node b needs to transmit the data to the node d for processing.

That is, when one set of target algorithm is provided by a plurality of nodes, and one set of target data is provided by a plurality of nodes, the target algorithm and the target data need to be processed according to a corresponding relationship between the data and the algorithm and an execution sequence of each algorithm.

If the task is split, one set of target algorithm is provided by one node. Therefore, in this case:

the nodes that provide the target data send the data provided to the nodes that provide the target algorithm, and the nodes that provide the target algorithm may process the received data.

Optionally, when that the target data includes a video stream or an audio stream, the processing submodule includes:

a first processing unit configured for interacting with the first target node and the second target node, so that the second target node processes a first data packet of the target data sent by the first target node by using the target algorithm;

wherein, the first data packet includes a video stream or an audio stream with a preset duration. The video of the preset duration may include a preset number of video frames.

Optionally, the processing submodule further includes:

a second processing unit configured for, in the process of receiving the processed first data packet sent by the second target node, interacting with the first target node and the second target node, so that the second target node processes a second data packet of the target data sent by the first target node by using the target algorithm;

wherein, the second data packet includes a video stream or an audio stream with a preset duration.

In the embodiment of the present disclosure, when processing the video stream or the audio stream, the data packets may be processed one by one, and the processed data packets may be sent out, that is, in the embodiment of the present disclosure, by data-driven computing, instead of waiting for the data collection to be completed, the computing is performed in steps during the output transmission, which improves efficiency and shortens the time delay.

In conclusion, specific application scenarios of the embodiment of the present disclosure may also be exemplified as follows:

For example, as shown in FIG. 7, one network topology includes a three-layer network structure, where the first layer includes nodes 101-106, the second layer includes nodes 201-202, and the third layer includes node 301. The node 101 stores real shooting data of a video, the node 102 stores AR materials, and the node 103 stores 3D scanned data.

When the 301 node needs a real shooting video in the 101 node as the background, the AR materials in the node 102 to increase the interest, and the scanned data of the node 103 as the content, at the beginning of the service, the node 301 sends out three requests, which may be broadcasted or sent directly from point to point, wherein the requests include: service type, resource request, data type and content description.

The node 101, the node 102 and the node 103 respond to the requests, with sample content feedback. After receiving the feedback from the nodes 101, 102 and 103, the node 301 plans a processing path by using the task processing method of the embodiment of the present disclosure, that is, the node that provides data and the node that provides contents are determined. For example, the nodes that provide data are the node 101, the node 102 and the node 103, and the node that provides algorithm is the node 201, the node 301 may issue a required video background generation code to the node 101 and issue an AR action and a time point to the node 102, issue 3D extraction time information and contents needed to the node 103, and issue a video synthesis code to the node 201.

After that, the 101 node uses the tools issued by the node 301 to preprocess the required video to generate a background video, which is encoded and compressed and sent to the node 201. The node 102 provides the AR material to the node 201 according to the required AR action and time point. The node 103 provides the 3D contents to the node 201 according to the required 3D contents and time point. The node 201 receives the related data provided by the node 101, the node 102 and the node 103 for video synthesis, transcodes, after synthesizing a new video, the node 201 forwards the new video to the node 301.

It can be known from the above that in the embodiment of the present disclosure, when performing task processing, the data and the algorithms are distributed to the network, instead of uniformly storing the data to the node that needs to perform the target task, or executing the target algorithm by the node that needs to execute the target algorithm, but are distributed to the node with the processing capability of the target algorithm to execute, that is, the embodiment of the present disclosure combines a distributed storage with distributed computing, which may not only improve the security of data, but also reduce the capability of a single node in the network topology, thereby reducing the design cost of the single node, and further reducing the design cost of the whole network topology.

Figure 8:
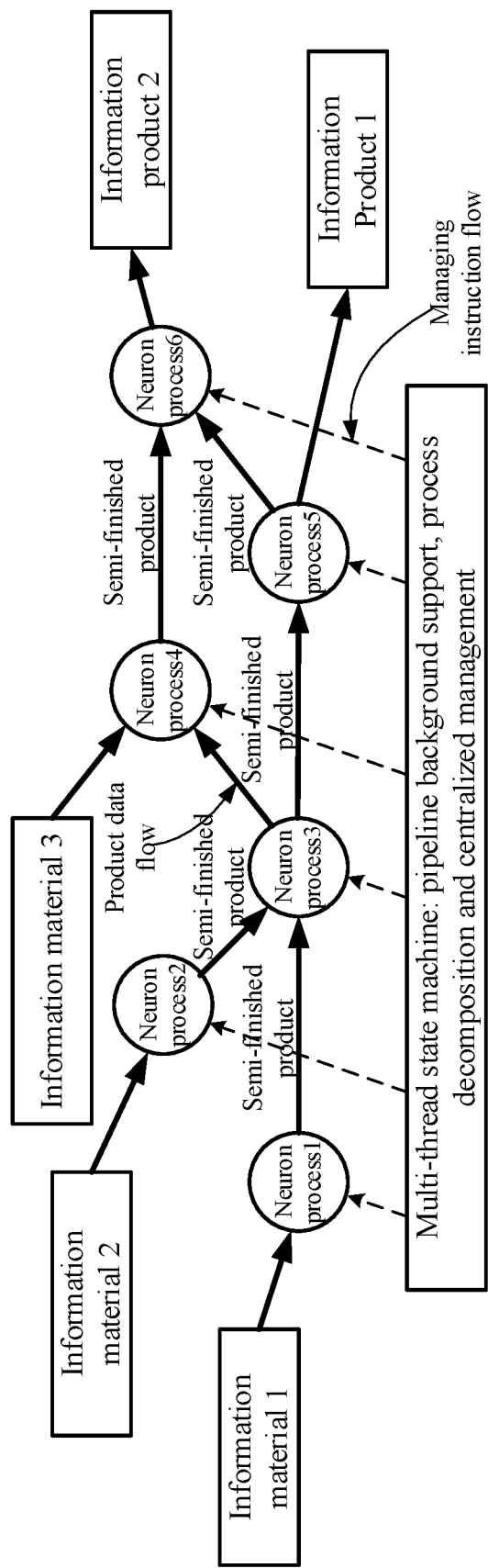
FIG. 8 is a schematic principle diagram of a pipeline processing method in the network topology in the embodiment of the present disclosure.

That is, in the embodiment of the present disclosure, it is not difficult to obtain the task processing method (i.e., information processing pipeline, or neural network) as shown in FIG. 8 by thoroughly decomposing and optimizing the computer disclosure process. Apparently, the design of each neuron process in the pipeline does not need complicated software. On the surface, the pipeline comprises many simple processes; and the key is a strong background support system. Future computing networks rely on network protocols to achieve superior management and collaboration capabilities without needing onion-like complex software. Such network protocols may be implemented in a variety of ways, and tailored to local conditions, with process decomposition and centralized management. The network protocol does not need complex software, or may easily realize the intercommunication of different software systems.

Therefore, the computer system according to the embodiment of the present disclosure abandons the inefficient Neumann onion structure, adopts the efficient pipeline task processing method and a CPU-free computer and the borderless computer network architecture, and integrates computing and network to dynamically adjust resources. It can be seen that the computer system according to the embodiment of the present disclosure integrates computing, communication and storage, eliminates the boundary of CPU, puts forward a new network pipeline computing flow, greatly simplifies the network operation, and forms an independent and controllable network computing architecture and a general computing platform with the integration of software and hardware, and will further combine with vertical industry applications to form low-delay artificial intelligence products with convenient development, flexible deployment and superior performance.

Optionally, the first communication module is a wireless communication module. That is, at least some of the computing devices in the plurality of computing devices in the computer system in the embodiment of the present disclosure may be connected by wireless communication.

Optionally, the wireless communication module is a centrally controlled time-division multiplexing wireless communication micro-base station network, that is, at least some computing devices in the plurality of computing devices in the computer system in the embodiment of the present disclosure are communicatively connected through a boundary adaptive micro-base station wireless communication network.

On the basis of traditional time division, the boundary adaptive micro-base station wireless communication network is additionally added with dynamic transmitting power control, multiple-base station unified resource coordination and statistical multiplexing technologies, and breaks through the traditional wireless cellular structure, implements multiple-base station unified macro time-slot allocation, assimilates all base stations and terminals, and dynamically adjusts cell boundaries according to distribution density and communication flow of user terminals.

In conclusion, the computer system according to the embodiment of the present disclosure is a combination of unstructured resources, and a computing network of unstructured resources is established, which is equivalent to Intel in PC industry. On the dimension of three basic resources (computing power, bandwidth and storage), the computer system further defines two combinations, namely storage exchange and computing exchange. These two combinations may meet the computing needs of any scale, even exceed the traditional computer category and cover the functions of high-performance networks. Then, these basic resources are managed by one set of protocol languages and executed by a single chip microcomputer. The scale of resources managed by this method may reach more than ten thousand times that of the single chip microcomputer itself. Therefore, the management cost may be neglected.

The computer system according to the embodiment of the present disclosure is actually a super network, which has a unified resource definition, a unified data structure, a unified hardware design and a heterogeneous algorithm engine having a unified interface. Starting from an inside of the chip, the computer system is superimposed many times to form a large coverage, which has been extended to the global network. It is ensured that one set of management rules, one set of software processes and one set of protocol languages are used to build the whole system. That is, the design of the computer system according to the embodiment of the present disclosure focuses on one target: to carry an operating system and application software. Therefore, the data center is made stronger (hundredfold efficiency), and bigger (without boundaries), and oriented to big markets (artificial intelligence and sensory networks).

The data center provided by the embodiment of the present disclosure includes: a hardware structure, an operating system and application software. It can face large-scale services and mass consumers, and once again expand the computing scale based on non-Neumann structure by more than 100 times. In other words, the total computing power may be easily expanded to than 10,000 times by the combination of the two measures. Moreover, the expansion of the computing power is not limited by Moore's law, and once for all, providing next generation computer with almost unlimited computing power resources with low energy consumption.

Actually, the target of the computer system according to the embodiment of the present disclosure is to eliminate the CPU. This is a one-way street of programmable computing: from the origin of all-CPU, to GPU, to single-FPGA coordinates multiple CPUs/GPUs, to single CPU manages multiple GPUs/FPGAs, until to the destination of all-FPGA. The way chosen by the computer system according to the embodiment of the present disclosure is to go straight to the ultimate target of the computer, which is to break the limit set by Neumann, give up the CPU, and give up the multicore CPU and multi-server structure recommended by the industry.

According to this ultimate target, the traditional operating system, cluster and virtual software, various middleware and database software are inevitably abandoned. In fact, the CPU and the traditional software are abandoned in general. Actually, giving up the CPU greatly simplifies the structure of the computer system according to the embodiment of the present disclosure.

In short, the embodiment of the present disclosure can reduce the dependence on the existing computer network and complex CPI chips, can realize the integrity of intellectual property, be self-controlled from bottom to top, and realize the whole design based on the existing Chinese industrial basic courses, which has great scientific and technological significance; can serve major products in major industrial fields, face the massive market of AI finance, AI transportation, AI chips and edge computing, and has great industrial significance in the field of producing world-class computing and network architecture companies in the AI era.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. A person skilled in the art may understand and implement the technical solutions without paying creative work.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not refer to the same one embodiment.

Many details are discussed in the specification provided herein. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

The above description is merely preferred embodiments of the present disclosure, but is not intended to limit the protection scope of the present disclosure. Any modifications, equivalent substitutions, and improvements made within the spirit and principle of the present disclosure shall all fall within the scope of protection claimed by the present disclosure.

The invention claimed is:

1. A computer system, comprising:
    a plurality of computing devices, wherein each computing device comprises a storage unit and at least one computing unit which are connected in parallel, the plurality of computing devices are divided into a plurality of nodes, and the plurality of nodes form a network topology;
    a communication device, wherein the communication device comprises an autonomous domain building module and a first communication module, wherein the autonomous domain building module is configured for, when it is detected that target nodes in the plurality of nodes meet resource requirements of a preset type of service, controlling the target nodes to form at least one of at least one layer autonomous domain that comprises at least one of the target nodes; and the first communication module is configured for connecting the plurality of computing devices in a communication manner; and
    a task processing device, wherein the task processing device comprises an addressing module and a task processing module, the addressing module is configured for addressing a first-type node and a second-type node in the network topology, the first-type node is a node providing target data required by a target task to be executed, the second-type node is a node providing a target algorithm required by the target task, and the addressing module is connected to the storage unit and the computing unit ; and the task processing module is configured for interacting with the first-type node and the second-type node, so that the second-type node processes the target data provided by the first-type node by using the target algorithm;
    the network topology comprises at least two layers of network structure, and the addressing module comprises:
    a parameter acquiring sub-module configured for acquiring a first correlation parameter of the target data and a second correlation parameter of the target algorithm;
    a first addressing sub-module configured for, in a first-layer network structure, addressing the first-type node according to the first correlation parameter of the target data, and addressing the second-type node structure according to the second correlation parameter of the target algorithm;
    a second addressing sub-module configured for forwarding the first correlation parameter to a node of the second-layer network structure when the first addressing sub-module fails to address the first-type node, until the first-type node is addressed, or until an addressing time for addressing the first-type node reaches a first preset time, wherein, the first-type node is addressed in the second-layer network structure after the node of the second-layer network structure receives the first correlation parameter; and
    a third addressing sub-module configured for forwarding the second correlation parameter to the node of the second-layer network structure when the first addressing sub-module fails to address the second-type node, or until an addressing time for addressing the second-type node reaches a second preset time, wherein, the second-type node is addressed in the second-layer network structure after the node of the second-layer network structure receives the second correlation parameter.

2. The computer system according to claim 1, wherein the storage unit comprises a first virtual management unit circuit for communicating and managing the storage unit, and the computing unit comprises a second virtual management unit circuit for communicating and managing the computing unit; the first virtual management unit circuit and the second virtual management unit circuit are connected to an external physical communication interface.

3. The computer system according to claim 2, wherein the computing unit comprises a programmable logic component.

4. The computer system according to claim 1, wherein the computing device further comprises:
    a second communication module connected to the storage unit, the computing unit and the external physical communication interface, and configured for determining a first surplus resource of a computing device to which the second communication module belongs at a current moment when receiving a resource request instruction; and
    a resource module connected to the storage unit, the computing unit, the external physical communication interface and the second communication module, and configured for acquiring required resource information according to the resource request instruction, wherein the required resource information comprises at least one resource selection mode;
    the resource module being further configured for allocating resources according to the first surplus resource and the resource selection mode comprised in the required resource information;
    the storage unit comprises a plurality of storage unit circuits, and the computing unit comprises a plurality of computing unit circuits, the resources comprise any one of a first type resource, a second type resource, a third type resource and a fourth type resource, or comprise the first type resource and the second type resource, or comprise the first type resource and the fourth type resource, or comprise the second type resource and the third type resource, or comprise the third type resource and the fourth type resource; and
    the first type resource comprises a first number of the storage units, the second type resource comprises a second number of the computing units, the third type resource comprises the storage unit circuits in a third number of the storage units, and the fourth type resource comprises the computing unit circuits in the fourth number of the computing units, and the first number, the second number, the third number and the fourth number are integers.

5. The computer system according to claim 4, wherein the resource module comprises:
   a first determining submodule configured for determining a first resource selection mode that the first surplus resource meets and a second resource selection mode that the first surplus resource does not meet, wherein the first resource selection mode and the second resource selection mode are at least one resource selection mode comprised in the required resource information;
   a second determining submodule configured for determining a second surplus resource after the first surplus resource meets the first resource selection mode; and
   a feedback submodule configured for feeding information of the first resource selection mode, the second resource selection mode and the second surplus resource back to a device that sends the resource request instruction.

6. The computer system according to claim 1, wherein the task processing module comprises:
   a task executing node determining sub-module selecting a node that provides one set of the target data as a first target node from at least one first-type node addressed by the addressing module, and selecting a node that provides one set of the target algorithm as a second target node from at least one second-type node addressed by the addressing module; and
   a processing submodule configured for interacting with the first target node and the second target node, so that the second target node processes the target data provided by the first target node by using the target algorithm.

7. The computer system according to claim 1, wherein the network topology further comprises at least one format conversion device for converting between a first data format and a second data format, and the format conversion device is connected between at least one node of the network topology and other networks;
   wherein, the first data format is employed in the network topology to transmit data, and the second data format is employed in the other networks to transmit data.

8. The computer system according to claim 1, wherein the first communication module is a wireless communication module.

* * * * *

UNITED STATES PATENT AND TRADEMARK OFFICE
CERTIFICATE OF CORRECTION

| | | |
|---|---|---|
| PATENT NO. | : 11,706,076 B2 | |
| APPLICATION NO. | : 17/794468 | |
| DATED | : July 18, 2023 | |
| INVENTOR(S) | : Yushi Shen et al. | |

It is certified that error appears in the above-identified patent and that said Letters Patent is hereby corrected as shown below:

On the Title Page

Item (72) The city of residence of all the inventors is Beijing (CN).

Signed and Sealed this
Twelfth Day of November, 2024

Katherine Kelly Vidal
*Director of the United States Patent and Trademark Office*